US011590425B2

(12) United States Patent
Matsushita

(10) Patent No.: US 11,590,425 B2
(45) Date of Patent: Feb. 28, 2023

(54) INFORMATION PROCESSING SYSTEM WITH INCREASED USER DRAW MODE STRATEGIES, AND ASSOCIATED INFORMATION PROCESSING APPARATUS, STORAGE MEDIUM AND INFORMATION PROCESSING METHOD

(71) Applicant: NINTENDO CO., LTD., Kyoto (JP)

(72) Inventor: Shingo Matsushita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/211,081

(22) Filed: Mar. 24, 2021

(65) Prior Publication Data
US 2021/0308583 A1 Oct. 7, 2021

(30) Foreign Application Priority Data
Apr. 2, 2020 (JP) .............................. JP2020-066710

(51) Int. Cl.
*A63F 13/69* (2014.01)
*A63F 13/35* (2014.01)
*A63F 13/822* (2014.01)
*A63F 13/63* (2014.01)

(52) U.S. Cl.
CPC .............. *A63F 13/69* (2014.09); *A63F 13/35* (2014.09); *A63F 13/63* (2014.09); *A63F 13/822* (2014.09)

(58) Field of Classification Search
CPC .......... A63F 13/35; A63F 13/69; A63F 13/63; A63F 13/822
See application file for complete search history.

(56) References Cited

U.S. PATENT DOCUMENTS

| 8,052,518 B1* | 11/2011 | Kelly ..................... G07F 17/32 463/25 |
| 2002/0082082 A1 | 6/2002 | Stamper et al. |
| 2004/0233223 A1 | 11/2004 | Schkolne et al. |
| 2007/0105626 A1 | 5/2007 | Cho et al. |

(Continued)

FOREIGN PATENT DOCUMENTS

JP 2018-047100 3/2018

OTHER PUBLICATIONS

U.S. Appl. No. 17/211,108, filed Mar. 24, 2021, Information Processing System, Information Processing Apparatus, Storage Medium and Information Processing Method.

*Primary Examiner* — Chase E Leichliter
(74) *Attorney, Agent, or Firm* — Nixon & Vanderhye PC

(57) ABSTRACT

An example of an information processing system is configured to, in a draw mode, display two or more selection candidates. In the draw mode, when a selection instruction to select at least one of unselected selection candidates is given, a game character that corresponds to the selected selection candidate is granted to the user. When the number of unselected selection candidates is equal to a first number, the process decreases an amount by which the predetermined parameter is decreased as compared with a case where the number of unselected selection candidates is equal to a second number greater than the first number. When a cumulative grant count becomes equal to or greater than a reference count, the information processing system permits execution of a designated mode in which a game character designated by the user is granted to the user.

20 Claims, 17 Drawing Sheets

(56) References Cited

U.S. PATENT DOCUMENTS

| | | | |
|---|---|---|---|
| 2012/0264513 A1* | 10/2012 | Kaneyoshi | A63F 13/537 |
| | | | 463/31 |
| 2013/0324265 A1* | 12/2013 | Takagi | G06F 17/00 |
| | | | 463/43 |
| 2014/0004955 A1* | 1/2014 | Nahari | A63F 13/35 |
| | | | 463/42 |
| 2018/0085668 A1* | 3/2018 | Matsushita | A63F 13/332 |
| 2018/0214775 A1* | 8/2018 | Karashima | A63F 13/63 |
| 2021/0197086 A1* | 7/2021 | Asuna | A63F 13/798 |
| 2021/0308583 A1* | 10/2021 | Matsushita | A63F 13/63 |
| 2021/0308584 A1* | 10/2021 | Matsushita | A63F 13/35 |
| 2021/0402296 A1* | 12/2021 | Takemura | A63F 13/79 |
| 2022/0189254 A1* | 6/2022 | Sugihara | A63F 13/79 |
| 2022/0212106 A1* | 7/2022 | Kawaguchi | A63F 13/792 |
| 2022/0258058 A1* | 8/2022 | Kawasaki | A63F 13/79 |

* cited by examiner

Fig.11

| SUCCESSIVE GRANT COUNT | LIKELIHOOD OF REAR CHARACTERS BEING CHOSEN |
|---|---|
| 5 TIMES | SELECTION PROBABILITY INCREASED(+0.25%) |
| 10 TIMES | SELECTION PROBABILITY INCREASED(+0.25%) |
| 15 TIMES | SELECTION PROBABILITY INCREASED(+0.25%) |
| ⋮ | ⋮ |
| 120 TIMES OR MORE | RARE CHARACTER SELECTION ENSURED |

INFORMATION PROCESSING SYSTEM WITH INCREASED USER DRAW MODE STRATEGIES, AND ASSOCIATED INFORMATION PROCESSING APPARATUS, STORAGE MEDIUM AND INFORMATION PROCESSING METHOD

CROSS REFERENCE TO RELATED APPLICATION

This application claims priority to Japanese Patent Application No. 2020-066710, filed on Apr. 2, 2020, the entire contents of which are incorporated herein by reference.

FIELD

The present disclosure relates to an information processing system, an information processing apparatus, a storage medium and an information processing method for granting game characters to the user by a draw.

BACKGROUND AND SUMMARY

There are conventional processes in which game characters are granted to the user by a draw.

Where game characters are granted by a draw, it is preferred to give more choices to the user as to strategies that can be employed by the user.

Therefore, the present application discloses an information processing system, an information processing apparatus, a storage medium and an information processing method, with which it is possible to increase the variety of strategies for a draw that can be employed by the user.

(1) An example of an information processing system, comprising: a processor and a memory coupled thereto, the processor being configured to control the information processing system to at least: start a draw mode in response to a first start instruction given by a user; in the draw mode, display on a display device two or more selection candidates determined based on a computer-simulated draw and each corresponding to a game character used in a game, in such a manner that the user can identify a part of a property of the game characters corresponding to the selection candidates; in the draw mode, perform a first grant process, wherein when the user gives a selection instruction to select at least one of unselected selection candidates in a state in which there are unselected selection candidates, the selected selection candidate is indicated as selected and a game character that corresponds to the selected selection candidate is granted to the user in exchange for decreasing a predetermined parameter; and in the draw mode, end the draw mode when an end instruction is given by the user or there is no unselected selection candidate left. When a new iteration of the draw mode is started in response to the first start instruction after the draw mode is ended, the processor displays on the display device a new set of selection candidates that are determined by a new computer-simulated draw in the iteration of the draw mode. When the selection instruction is received in such a state in which the number of unselected selection candidates is equal to a first number, the processor decreases an amount by which the predetermined parameter is decreased for the selection instruction as compared with that in a state in which the number of unselected selection candidates is equal to a second number greater than the first number. The processor being configured to further control the information processing system to at least: update a cumulative grant count each time the first grant process is performed in one or more iteration of the draw mode started in response to the first start instruction; permit execution of a designated mode when the cumulative grant count becomes equal to or greater than a first reference count; start the designated mode in response to a second start instruction given by the user; in the designated mode, display on the display device one or more of the game characters in such a manner that the user can uniquely identify the game characters; and in the designated mode, perform a second grant process of granting to the user a game character designated by the user.

With configuration (1) above, in the draw mode, the user can employ a strategy of keeping selecting only those selection candidates that indicate a part of the property of a game character or game characters desired by the user, or a strategy of keeping selecting any selection candidates displayed as much as possible so as to quickly increase the cumulative grant count in order to execute the designated mode. Thus, it is possible to increase the variety of strategies for a computer-simulated draw that can be employed by the user.

(2) In the draw mode, the processor may display on the display device selection candidates corresponding to a set of game characters that are chosen by a probability-based computer-simulated draw from among a plurality of game characters including normal characters and rare characters, wherein a probability of a rare character being determined as a selection candidate is lower than a probability of a normal character being determined as a selection candidate. In the designated mode, the processor may display on the display device a rare character or rare characters as the one or more game characters.

With configuration (2) above, it is possible to strongly motivate the user to perform the draw mode until execution of the designated mode is permitted.

(3) In the draw mode, the processor may display on the display device the selection candidates corresponding to a set of game characters that are determined by a probability-based computer-simulated draw from among a plurality of game characters including normal characters and rare characters, wherein a probability of a rare character being chosen as a selection candidate is lower than a probability of a normal character being chosen as a selection candidate. The processor may further control the information processing system to at least update a successive grant count each time a normal character is granted successively by the first grant process in the draw mode, and reset the successive grant count when a rare character is granted by the first grant process. In the draw mode, on a condition that the successive grant count becomes equal to or greater than a second reference count, the processor may display on the display device a predetermined number of selection candidates that correspond to rare characters.

With configuration (3) above, it is possible to motivate the user to continuously perform the draw mode until the successive grant count becomes equal to or greater than the second reference count.

(4) In the draw mode, the processor may display on the display device the selection candidates corresponding to a set of game characters that are chosen by a probability-based computer-simulated draw from among a plurality of game characters including normal characters and rare characters, wherein a probability of a rare character being determined as a selection candidate is lower than a probability of a normal character being determined as a selection candidate. The processor may be configured to further control the information processing system to at least: update a successive grant count each time a normal character is granted successively by the first grant process in the draw mode, and reset the successive grant count when a rare character is granted by the first grant process; and increase a probability of a rare character being determined as a selection candidate in the draw mode when the successive grant count becomes equal to a third reference count, and reset the probability when the successive grant count is reset.

With configuration (4) above, it is possible to motivate the user to continuously perform the draw mode.

(5) The processor, when a rare character is granted by the second grant process in the designated mode in a state in which the probability is increased, may maintain the increased probability.

With configuration (5) above, it is possible to reduce the possibility of the user losing motivation to perform the draw mode after the end of the designated mode.

(6) The processor may prohibit starting a new iteration of the draw mode and permit execution of the designated mode when the cumulative grant count becomes equal to or greater than the reference count. In the draw mode, the processor may accept a selection instruction until the end process is performed even after the cumulative grant count becomes equal to or greater than the reference count.

With configuration (6) above, when the cumulative grant count becomes equal to or greater than the reference count, the information processing system prohibits starting a new iteration of the draw mode while accepting a selection instruction until the end process is performed. Therefore, when the cumulative grant count becomes equal to or greater than the reference count, the user can choose between ending the draw mode immediately and continuing the selection instruction. Thus, it is possible to increase the variety of strategies for a computer-simulated draw that can be employed by the user.

(7) The one or more game characters displayed in the designated mode may be game characters that can be determined as selection candidates by the computer-simulated draw in the draw mode.

With configuration (7) above, it is possible to more strongly motivate the user to perform the draw mode.

(8) Under certain conditions, the processor may accept a selection instruction not in exchange for decreasing the predetermined parameter and grants a game character corresponding to the selection candidate selected by the selection instruction to the user. The processor may calculate the cumulative grant count as a sum between the number of times a game character is granted by the first grant process and the number of times a game character is granted by the selection instruction that is accepted not in exchange for decreasing the predetermined parameter.

With configuration (8) above, the cumulative grant count is calculated based on both selection instructions that are given in exchange for decreasing the predetermined parameter and selection instructions that are given not in exchange for decreasing the predetermined parameter. By using different methods of incrementing the cumulative grant count, it is possible to improve the strategic aspect.

(9) In the information processing system, different draw modes can be executed, between which a draw probability is varied for at least one game character. The processor may update the cumulative grant count for at least one of the draw modes, and update the cumulative grant count for each draw mode.

With configuration (9) above, it is possible to allow the user to give a consideration as to which one of a plurality of draw modes to perform, thus improving the strategic aspect of the draw mode.

(10) The processor may accept the first start instruction within a predetermined period in real time. The processor may accepts the second start instruction within the predetermined period.

With configuration (10) above, even when the period in which the designated mode can be executed is predefined, it is possible to prompt the user to immediately perform the designated mode.

(11) In the designated mode, the processor may grant to the user a game character designated by the user not in exchange for decreasing the predetermined parameter.

With configuration (11) above, it is possible to strongly motivate the user to perform the draw mode until execution of the designated mode is permitted.

(12) The processor may permit execution of the designated mode until the number of times the designated mode is executed becomes equal to a predetermined upper limit number of times.

With configuration (12) above, it is possible to reduce the possibility of lowering the playability of the draw mode.

(13) The predetermined parameter may represent an amount of virtual currency or virtual items in the game.

With configuration (13) above, the user makes a selection in the draw mode in exchange for consuming virtual currency or virtual items in the game, thus improving the strategic aspect of the computer-simulated draw game.

Note that the present specification discloses an information processing apparatus (e.g., a terminal apparatus or a server) that executes some or all of the processes recited in (1) to (13) above. The present specification also discloses a storage medium storing an information processing program that causes a computer to execute some or all of the processes recited in (1) to (13) above. The present specification also discloses an information processing method that is executed by the information processing system of (1) to (13) above.

With the information processing system, the information processing apparatus, the storage medium or the information processing method set forth above, it is possible to increase the variety of strategies that can be employed by the user in a computer-simulated draw.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a table showing an example of the relationship between the successive grant count and the degree of probability by which a rare character is chosen;

DETAILED DESCRIPTION OF NON-LIMITING EXAMPLE EMBODIMENTS

1. Configuration of Information Processing System

Figure 1:
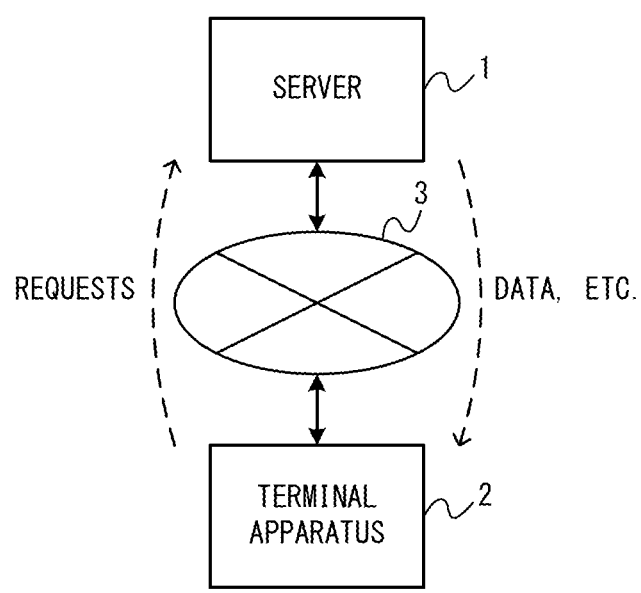
FIG. 1 is a block diagram showing an example of the configuration of a non-limiting information processing system according to the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
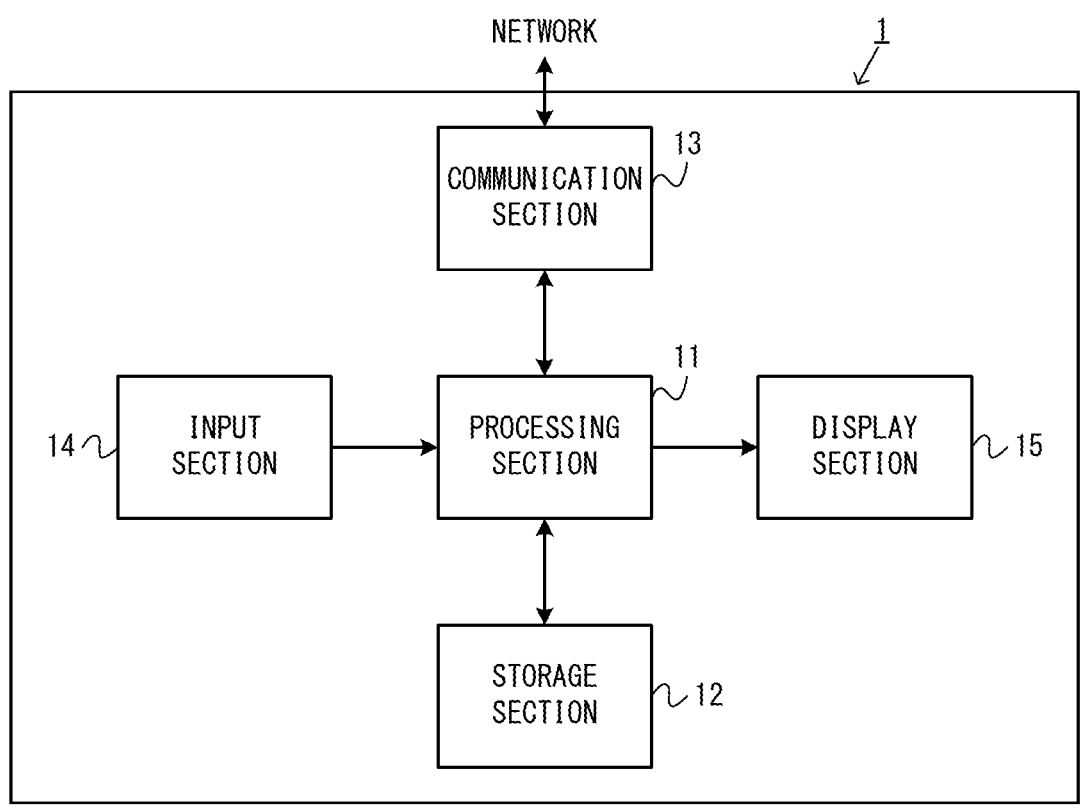
FIG. 2 is a block diagram showing an example of the configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. Using the communication section 13, the processing section 11 transmits information to the other devices and receives information from the other devices. The server 1 further includes an input section 14 and a display section 15 as input/output interfaces.

(Specific Example of Configuration of Terminal Apparatus 2)

Figure 3:
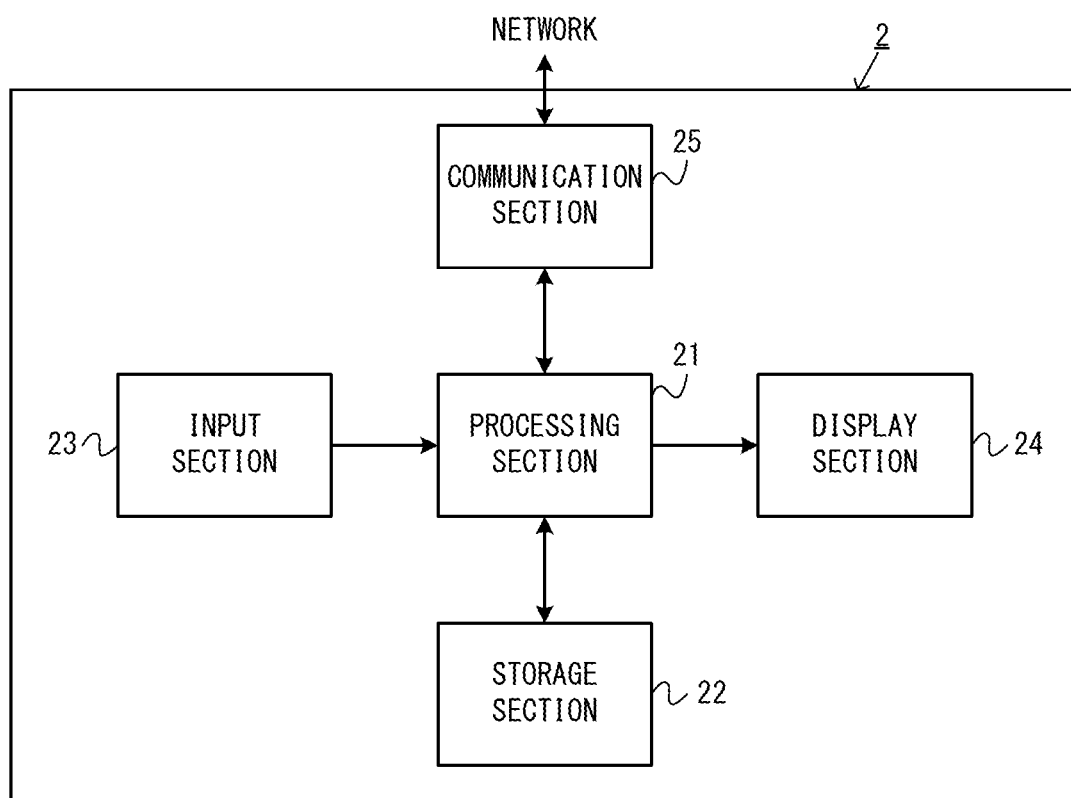
FIG. 3 is a block diagram showing an example of the configuration of a non-limiting terminal apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 outputs data based on an input performed by the user to the processing section 21. The processing section 21 determines the content of an input performed by the user based on data from the input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). Using the communication section 25, the processing section 21 transmits information to the other devices and receives information from the other devices. The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

2. Outline of Process in Information Processing System

Processes to be executed in an information processing system according to the present embodiment will now be outlined. In the present embodiment, the information processing system executes a summon game in a game application. In the summon game, the user is granted a game character corresponding to a selection candidate that is selected by the user from among a predetermined initial number (here, five) of selection candidates that have been chosen by a draw (a computer-simulated draw). Note that in the game of the present embodiment, granting of a game character to the user in a summon game is represented as a game character being summoned from another world. Therefore, in the present embodiment, granting a game character to the user is referred to as "summoning", and the game in which a game character is granted to the user is referred to as a summon game.

In the present embodiment, in addition to the summon game, a game that is played by using a game character that has been granted to the user in the summon game is also played in the game application. Note that a game character is not limited to a human-shaped game object (e.g., a player character controlled by the user), but also includes game objects such as weapons and items used in the game. The game that is played by using a game character may be of any content, and it may be a game such as a simulation game, a puzzle game, an action game or a race game.

[2-1. Flow of Summon Game Mode]

Figure 4:
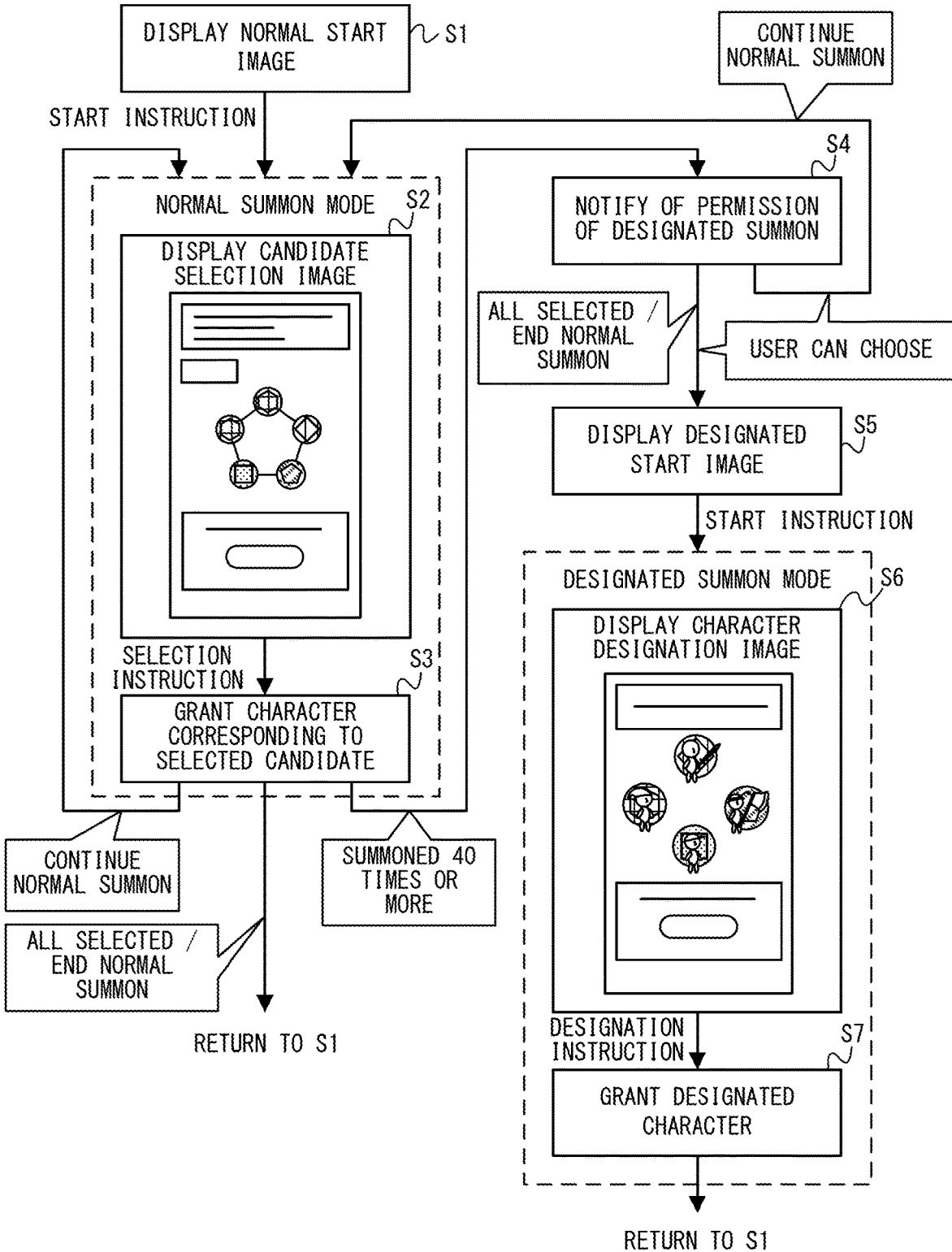
FIG. 4 is a diagram showing an example of a flow of a non-limiting summon game mode according to the present embodiment.

FIG. 4 shows an example of a flow of a summon game mode in the present embodiment. In the present embodiment, the summon game mode in which the summon game is played includes the normal summon mode (step S2, S3) and the designated summon mode (step S6, S7).

The normal summon mode is a mode in which the user is granted a game character corresponding to the selection candidate selected by the user from among the selection candidates that have been chosen by a draw. Note that as will be later described in detail, when selecting from selection candidates in the normal summon mode, the selection candidates corresponding to game characters are displayed in such a manner that the game characters cannot be uniquely identified. The designated summon mode is a mode in which the user is granted a game character that is designated by the user from among particular game characters that are predetermined in the game application. In the designated summon mode, the particular game characters are displayed in such a manner that the game characters can be uniquely identified. Thus, in the normal summon mode, it is uncertain which game character the user can obtain, whereas in the designated summon mode, it is ensured that the user can obtain a desired game character from among the particular game characters.

[2-1-1. At Start of Normal Summon Mode]

As shown in FIG. 4, when the summon game is executed for the first time, the normal summon mode is executed (i.e., the summon game is executed in the normal summon mode). In this case, the terminal apparatus 2 displays a normal start image on the display section 24 (step S1). The normal start image is a user interface image used for receiving, from the user, a start instruction for starting the normal summon mode. The details of the normal start image will now be described with reference to FIG. 5.

Figure 5:
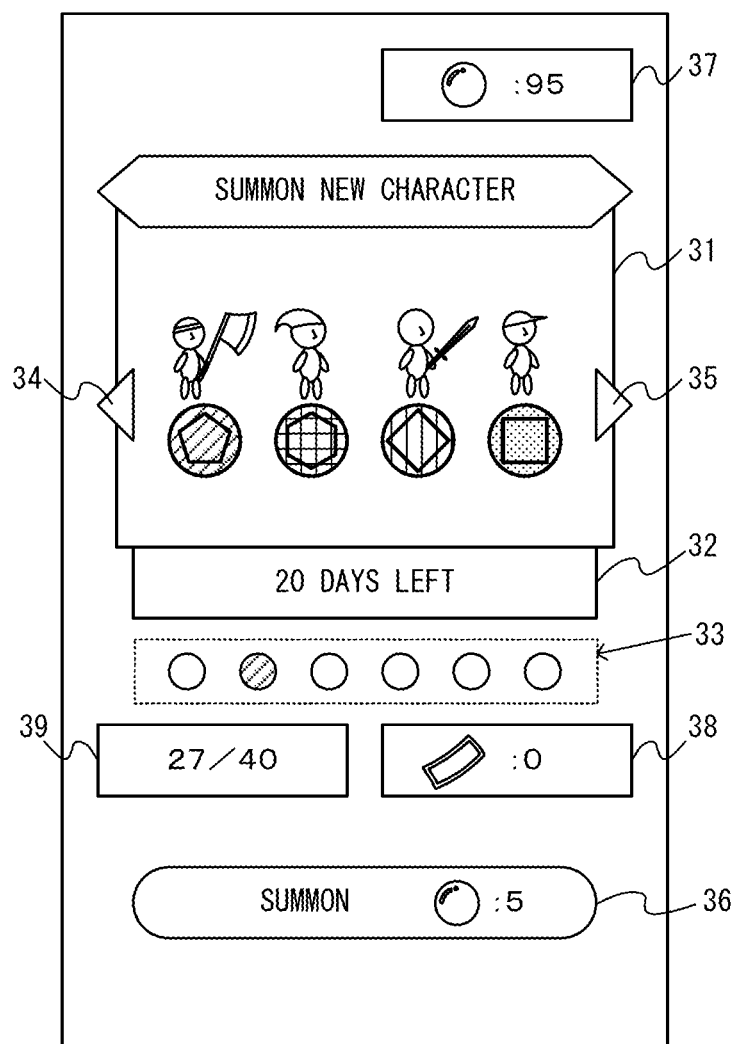
FIG. 5 is a diagram showing an example of a non-limiting normal start image.

FIG. 5 is a diagram showing an example of the normal start image. As shown in FIG. 5, the normal start image includes a content image 31 that represents the content of the summon game. Here, in the present embodiment, it is assumed that the game application has different summon games. For example, a different game character may be more likely to be chosen by a draw in each summon game, or each summon game may use a different set of game characters from which game characters are chosen by a draw. There may be a certain game character that can be selected only in a particular summon game. Note that in the present embodiment, a particular summon game (a summon game called "SUMMON NEW CHARACTER" to be described below) can be executed both in the normal summon mode and in the designated summon mode. On the other hand, other summon games may be executable only in the normal summon mode while being not executable in the designated summon mode.

As the content of a summon game, the content image 31 includes the name of the summon game ("SUMMON NEW CHARACTER" in FIG. 5). In the present embodiment, the content image 31 shows, as the content of the summon game, some of the game characters that can be selected in the summon game (here, rare characters to be described below) (see FIG. 5). As will be later described in detail, in the present embodiment, each game character is assigned an attribute. The content image 31 includes images representing the game characters as well as images of attribute symbols representing attributes assigned to the game characters (see FIG. 5).

As shown in FIG. 5, the normal start image includes a period image 32 that represents the period in which the summon game represented by the content image 31 is executable. In the present embodiment, the executable period is set for each summon game. The period in which the summon game is executable is a period that is defined in real time, e.g., from Mar. 1, 2020 to Mar. 31, 2020. In the present embodiment, the period image 32 includes information that represents the remaining amount of time for which the summon game is executable, such as "20 DAYS LEFT", for example.

As shown in FIG. 5, the normal start image includes a plurality of summon game icons 33. Each summon game icon 33 represents one of a plurality of summon games provided in the game application that is executable at present. In the example shown in FIG. 5, six summon games are executable, and six summon game icons 33 are displayed. The draw icon that represents the summon game currently selected (i.e., the summon game corresponding to the content image 31) is displayed in a manner different from that for the other draw icons, which are not currently selected. Note that in FIG. 5, hatching is used to represent the difference in the manner of display of the draw icon.

As shown in FIG. 5, the normal start image includes switch instruction images 34 and 35 used for giving a switch instruction to switch the selected summon game to another. That is, in response to the user performing an input on the switch instruction image 34 or 35, the selected summon game is switched to another, and the content image 31 and the period image 32 are also switched accordingly. Note that although it is assumed in the present embodiment, that an input performed on various images displayed on the display section 24 of the terminal apparatus 2 is performed by touching on the images, for example, the method by which the user performs an input for giving an instruction may be any method.

As shown in FIG. 5, the normal start image includes a start button image 36 used for giving a start instruction to start the normal summon mode. That is, in response to a start instruction having been given by the user by performing an input on the start button image 36, the summon game being selected is started in the normal summon mode. Thus, by performing an input on the switch instruction images 34 and 35, the user can select a desired summon game from among a plurality of summon games executable, and by performing an input on the start button image 36 while the desired summon game is selected, the user can start the summon game.

Here, in the present embodiment, summoning in the summon game (i.e., granting of a game character to the user) is performed in exchange for consumption of summon points that are used in the game (note however that summoning can be performed without consuming summon points under certain conditions in the present embodiment). Therefore, the start button image 36 includes information that represents the amount of summon points to be consumed in exchange for summoning in response to an input performed on the start button image 36. In the example shown in FIG. 5, it is indicated that five summon points will be consumed for summoning in response to an input performed on the start button image 36. Note that the summon points may represent the number of particular items owned by the user in the game, for example.

As shown in FIG. 5, the normal start image includes a point ownership image 37 that indicates the amount of summon points currently owned by the user. In the present embodiment, the user can obtain summon points by purchasing summon points with real currency or by satisfying conditions in the game application (e.g., clearing a particular game stage).

As shown in FIG. 5, the normal start image includes a ticket ownership image 38 that represents the number of tickets currently owned by the user. A ticket is an item in the game and is an example of an item with which it is possible to summon without consuming summon points. In the present embodiment, it is possible to start a summon in the summon game in exchange for consuming one ticket instead of consuming summon points. In the present embodiment, the user can obtain a ticket by satisfying a condition in the game application.

Note that when a summon is performed while the user owns both summon points and a ticket, either summon points or a ticket may be consumed preferentially over the other, or the user may be allowed to specify which one to consume. Note that the method for summoning without consuming summon points is not limited to the method of summoning by consuming a ticket. For example, in other embodiments, the information processing system may allow the first summon in the summon game to be performed without consuming summon points.

As shown in FIG. 5, the normal start image includes a cumulative grant count image 39 that represents the cumulative grant count. The cumulative grant count refers to the cumulative number of times a game character has been granted to the user by summoning in the summon game (here, a summon game named "SUMMON NEW CHARACTER").

As will be later described in detail, in the present embodiment, execution of the designated summon mode described above is permitted on the condition that the cumulative grant count has become equal to a predetermined permit count (here, 40 times). In the present embodiment, the cumulative grant count image 39 shows the current cumulative grant count (27 in the example shown in FIG. 5) and the permit count.

As described above, in the present embodiment, the information processing system displays information that represents the cumulative grant count on the display device while the information processing system is ready to accept a start instruction of the normal summon mode (i.e., in a state in which the normal start image is displayed). Then, the user can decide whether or not to execute the normal summon mode so that execution of the designated summon mode is permitted, by referring to the cumulative grant count, thereby improving the convenience of the user.

Note that although not shown, the normal start image may include a button image used for giving an instruction to display a menu image or a button image used for giving an instruction to start another game other than the summon game. When an input is performed on these button images, the terminal apparatus 2 ends the summon game mode.

[2-1-2. Selection of Selection Candidates]

When the start instruction is given while the normal start image is displayed, the normal summon mode is started. At this time, first, the terminal apparatus 2 displays a candidate selection image on the display section 24 (step S2 shown in FIG. 4). The candidate selection image is a user interface image used for accepting a selection instruction from the user to select one of the selection candidates. The details of the candidate selection image will now be described with reference to FIG. 6.

Figure 6:
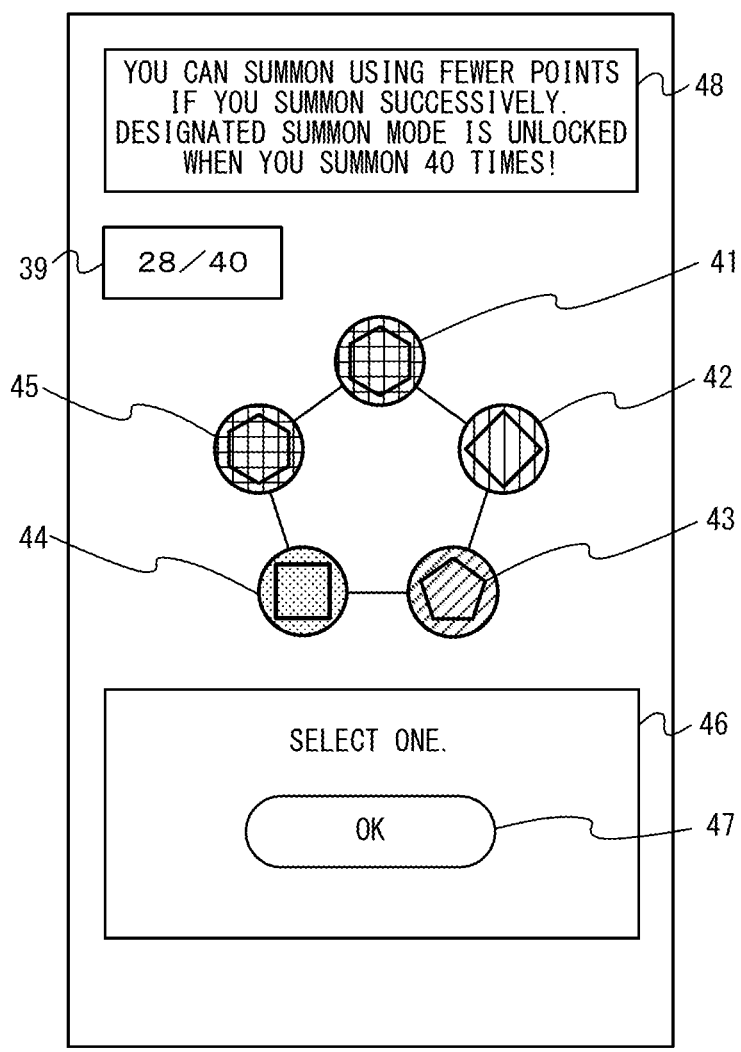
FIG. 6 is a diagram showing an example of a non-limiting candidate selection image.

FIG. 6 shows an example of a candidate selection image. As shown in FIG. 6, the candidate selection image includes five attribute symbols 41 to 45, which are five selection candidates from which the user can make a selection. The attribute symbols 41 to 45 represent the attributes of the game characters that have been chosen by a draw, which are game characters corresponding to the selection candidates.

Here, in the present embodiment, each game character has one of the following attributes: red attribute, blue attribute, green attribute and colorless attribute. Note that for each game character, the server 1 stores information representing the attribute assigned to the game character in association with the game character. In the present embodiment, the attribute symbols representing the attributes are displayed in colors of the respective attributes. Note that in FIG. 6, the different colors of the attribute symbols are represented by different hatching (this similarly applies to other figures).

Note that the attribute of a game character is information that is assigned to each game character and is an example of a property that is assigned to the game character. The property of a game character means to include, for example, type, state, ability, etc., of the game character, as well as the attribute of the game character. The property of a game character can be any information based on which the game character can be classified into a number of classes (fewer than the number game characters). Note that in other embodiments, multiple properties (specifically, attributes) may be assigned to one game character. Then, an attribute symbol may represent any one of a plurality of attributes assigned to the game character. An attribute of a game character (which is assigned a plurality of attributes) that is represented by the attribute symbol may be randomly determined, may be predetermined, or may be determined according to a predetermined condition (e.g., a condition related to parameters of the game character).

Note that the number of selection candidates presented when the normal summon mode is started (i.e., the initial candidate count) is five in the present embodiment, but the initial candidate count in other embodiments does not need to be fixed and may be variable. For example, the initial candidate count may vary for different summon games, or the initial candidate count may change randomly.

In the present embodiment, when the start instruction is given, the information processing system chooses, by a draw, five game characters that are to be selection candidates from among game characters that are objects of the draw (i.e., game characters that can be granted to the user). Then, attribute symbols that represent the attributes of the chosen game characters are displayed on the terminal apparatus 2 as selection candidates. Thus, in the present embodiment, in the normal summon mode, the user cannot uniquely identify game characters, which are selection candidates, but can select one of the selection candidates in a state in which the user can recognize the attribute of the game character.

Note that the specific method of the draw to choose game characters to be selection candidates may be any method. For example, the server 1 stores information in which each game character, which is an object of the draw, is associated with a numerical value that represents the selection probability. The server 1 performs the draw using a random number so that each game character will be chosen with the probability based on the numerical value. Note that this numerical value may be a numerical value expressed in percentage or a numerical value that represents the degree of selection probability (e.g., the higher the numerical value, the more likely the game character will be chosen).

In the present embodiment, the game characters are classified into a plurality of groups with different selection probabilities. Specifically, game characters are classified into two groups: normal characters and rare characters for which the selection probability is set to be lower than normal characters. Note that the game characters classified as normal characters do not need to have a constant selection probability, and the game characters classified as rare characters do not need to have a constant selection probability. For example, normal characters may be further classified into the first group of a higher selection probability and a second group of a lower selection probability (but higher than the selection probability of rare characters). The selection probabilities of the normal characters and/or the rare characters may vary between different summon games.

As shown in FIG. 6, the candidate selection image includes a selection window 46. The selection window 46 includes a message that prompts the user to select an attribute symbol (the message "SELECT ONE" in FIG. 6). The selection window 46 also includes a selection confirm button 47 used for giving a selection instruction to select a selection candidate. While the candidate selection image is displayed, the user first performs an input of specifying one of the attribute symbols 41 to 45, and further performs an input on the selection confirm button 47, thereby giving a selection instruction. This means that the designated attribute symbol (i.e., a selection candidate) has been selected.

When the user gives a selection instruction, the game character corresponding to the selected attribute symbol is granted to the user (step S3 shown in FIG. 4). Specifically, the terminal apparatus 2 displays on the display section 24 a special effects image that shows the game character being summoned to appear, and grants the game character to the user.

In the present embodiment, in a single iteration of the normal summon mode started by the start instruction, the user can select at least one and a maximum of five attribute symbols from among the five attribute symbols chosen by a draw. That is, when a selection instruction is given while the candidate selection image shown in FIG. 6 is displayed, the user may either further give a selection instruction by continuing the normal summon mode or end the normal summon mode without giving a further selection instruction (see FIG. 4).

Figure 7:
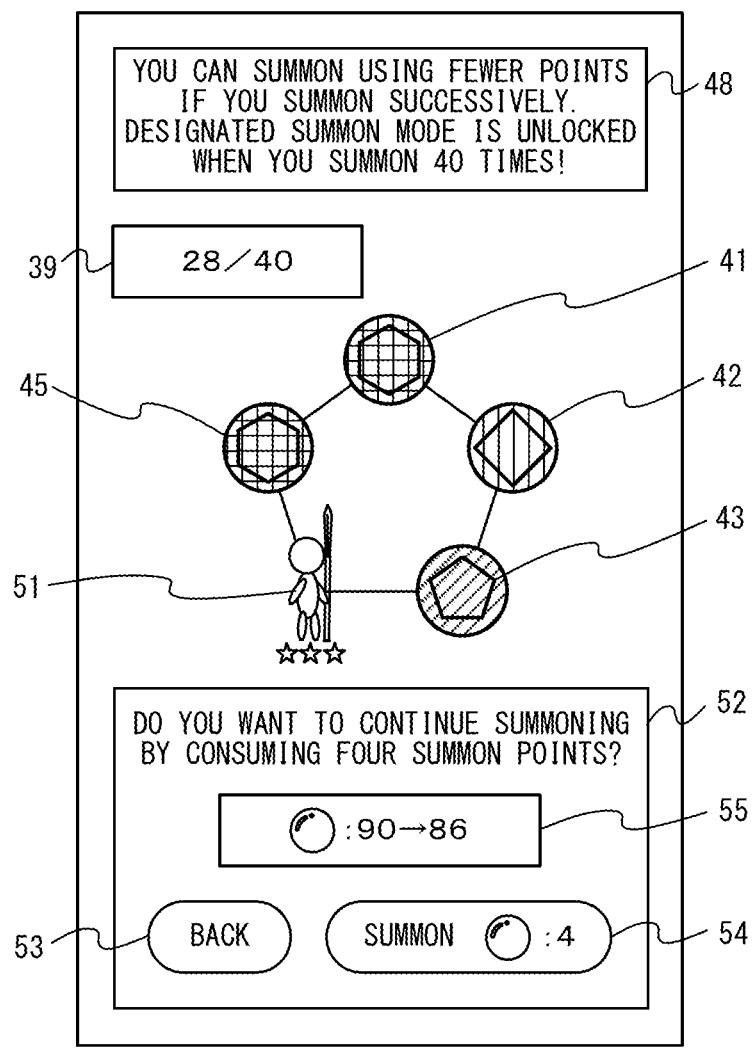
FIG. 7 is a diagram showing another example of a non-limiting candidate selection image.

FIG. 7 shows another example of a candidate selection image. The candidate selection image shown in FIG. 7 is one that is displayed on the display section 24 after one game character has been granted in response to a selection instruction given for the candidate selection image shown in FIG. 6. Note that it is assumed herein that a selection instruction has been given to select the attribute symbol 44 among the attribute symbols 41 to 45 included in the candidate selection image shown in FIG. 6.

As shown in FIG. 7, in the candidate selection image displayed after the attribute symbol 44 is selected, a character image 51 that represents a game character corresponding to the attribute symbol 44 is displayed instead of the attribute symbol 44. Therefore, in the state shown in FIG. 7, the number of selection candidates is four.

Note that in the present embodiment, the character image 51 includes an image (an image of three stars in FIG. 7) that represents the rarity level in accordance with the selection probability of the game character. In the present embodiment, the rarity level is represented by three or four stars for normal characters described above, and the rarity level is represented by five stars for rare characters described above. Thus, by looking at the candidate selection image, the user can see game characters that have been granted in the current iteration of the normal summon mode and the rarity levels thereof.

As shown in FIG. 7, the candidate selection image that is displayed after a game character has been granted includes a continuation confirm window 52. The continuation confirm window 52 includes a message asking the user whether or not to continue the normal summon mode (the message "DO YOU WANT TO CONTINUE SUMMONING BY CONSUMING FOUR SUMMON POINTS?" in FIG. 7). The continuation confirm window 52 includes a back button image 53 and a continue button image 54. The back button image 53 is a button image used for giving an end instruction to end the normal summon mode being currently executed. That is, in response to an input performed by the user on the back button image 53, the terminal apparatus 2 ends the normal summon mode and displays a start image (specifically, the normal start image described above or the designated start image to be described below) on the display section 24.

The continue button image 54 is a button image used for giving a continue instruction to continue the normal summon mode being executed. That is, in response to an input performed by the user on the continue button image 54, the terminal apparatus 2 erases the continuation confirm window 52 and displays the selection window 46 in place of the continuation confirm window 52 (see FIG. 6). This allows the user to give a selection instruction again.

Thus, in the present embodiment, each time a game character is granted to the user in response to a selection instruction, the continuation confirm window 52 is displayed, and the user can select whether to end or to continue the normal summon mode. Then, if the user keeps selecting in the normal summon mode, the user can give the selection instruction five times. Note that after the fifth selection instruction is given, the terminal apparatus 2 ends the normal summon mode and displays the start image again (see FIG. 4). Note that when ending the normal summon mode, the terminal apparatus 2 may display the start image after displaying an image representing the five game characters granted (e.g., an image including images of the game characters instead of the attribute symbols in the candidate selection image) as an image representing the result of the current iteration of the normal summon mode.

Note that in the present embodiment, since summon points are consumed for each summon, the second and subsequent selections in a single iteration of the normal summon mode are also done in exchange for consuming summon points. That is, in the present embodiment, the user may give a start instruction or a continue instruction described above in exchange for consuming summon points. Here, in the present embodiment, the amount of summon points to be consumed for a start instruction or a continue instruction in a single iteration of the normal summon mode is determined based on the number of summons performed in a single iteration of the normal summon mode. Specifically, a start instruction to perform the first summon in the normal summon mode can be given in exchange for consuming five summon points. A continue instruction to perform the second to fourth summon in the normal summon mode can be given in exchange for consuming four summon points per instruction. A continue instruction to perform the fifth summon in the normal summon mode can be given in exchange for consuming three summon points. Thus, in the present embodiment, it can be said that the amount of summon points to be consumed for a start instruction or a continue instruction is determined based on the number of selection candidates that have been unselected in the current iteration of the normal summon mode.

In the present embodiment, the continue button image 54 includes information that represents the amount of summon points (here, four) to be consumed for a selection instruction using the continue button image 54. The continuation confirm window 52 includes a change-of-points image 55 that represents the change of summon points owned by the user when the selection instruction is given. With the continue button image 54, the user can check the summon points to be consumed for a selection instruction, and with the change-of-points image 55, the user can check the number of points owned by the user before and after the selection instruction.

Thus, in the present embodiment, if the user performs five iterations of the normal summon mode while selecting only one selection candidate in each iteration, a total of 25 summon points will be consumed. In contrast, if the user selects all of the five selection candidates in a single iteration of the normal summon mode, a total of 20 summon points will be consumed. That is, in the latter case, as compared with the former case, it is possible to reduce the amount of summon points to be consumed for selecting five selection candidates. In the present embodiment, the candidate selection image includes an information notification window 48 (see FIG. 6 and FIG. 7), and the information notification window 48 includes a message indicating that the consumption of summon points can be reduced by successively giving selection instructions in a single iteration of the normal summon mode (the message "YOU CAN SUMMON USING FEWER POINTS IF YOU SUMMON SUCCESSIVELY" in FIG. 6 and FIG. 7).

On the other hand, in the present embodiment, since attribute symbols are displayed in the candidate selection image, the user can guess, based on the attribute symbols, whether there is a possibility of obtaining a desired game character in the current iteration of the normal summon mode. For example, where a game character desired by the user is of the red attribute, assume a case where two of the five attribute symbols displayed in the candidate selection image are of the red attribute. In this state, the user will not obtain the desired game character by selecting any of the three non-red attribute symbols, and in order to obtain the desired game character, the user can employ a strategy of selecting the two red attribute symbols, ending the normal summon mode, and then starting a new iteration of the normal summon mode. In the state described above, the user may also employ a strategy of selecting the five attribute symbols in order to reduce the number of summon points to be consumed.

Thus, in the present embodiment, the user may draw using any of two strategies in the normal summon mode: (a) reducing the consumption of summon points by continuing the normal summon mode, and (b) ending an iteration of the normal summon mode in the middle and then starting a new iteration of the normal summon mode in order to increase the probability of obtaining the desired game character. Therefore, it is possible to enhance the strategic aspect of the summon game and improve the playability of the game.

As shown in FIG. 6 and FIG. 7, the candidate selection image includes the cumulative grant count image 39. That is, the information processing system updates (e.g., increments)

the cumulative grant count in the normal summon mode, and displays the updated cumulative grant count image 39 representing the cumulative grant count on the display section 24. Note that as described above, in the present embodiment, execution of the designated summon mode is permitted when the cumulative grant count becomes equal to the permit count. Therefore, the information notification window 48 included in the candidate selection image includes a message indicating that execution of the designated summon mode will be permitted when a number of summons equal to the permit count are performed (the message "DESIGNATED SUMMON MODE IS UNLOCKED WHEN YOU SUMMON 40 TIMES!" in FIG. 6 and FIG. 7).

As described above, in the present embodiment, the information processing system displays on the display device information representing the cumulative grant count, together with the selection candidates, during the normal summon mode. Then, since the user can check the cumulative grant count while in the normal summon mode, the user can determine whether or not to continue the normal summon mode by referring to the cumulative grant count. This improves the convenience of the user.

Note that in the present embodiment, the information processing system consumes summon points and updates the cumulative grant count at a point in time when the start instruction or the continue instruction is confirmed. For example, in the candidate selection image shown in FIG. 6, a start instruction has been given in the normal start image shown in FIG. 5 but a selection instruction has not been given. Therefore, a game character has therefore not been granted but the cumulative grant count has been updated (in the state shown in FIG. 6, the cumulative grant count has been incremented by one from the state shown in FIG. 5). This is because in the present embodiment, confirmation of the start instruction or the continue instruction by the user in turn confirms the consumption of summon points and the granting of the game character to the user.

Note that there is no limitation on when the information processing system updates the cumulative grant count, and the information processing system may update the cumulative grant count at a different point in time in other embodiments. For example, the information processing system may update the cumulative grant count at a point in time when a selection instruction is given or may update the cumulative grant count at a point in time when a game character is granted to the user.

In the present embodiment, when receiving various instructions by the user (e.g., a selection instruction, a start instruction, etc.), the terminal apparatus 2 may display an instruction confirm window. For example, when a start instruction is received by the user, the terminal apparatus 2 may display the message "START?" and an instruction confirm window that includes a back button image and an execute button image. Then, when an input is performed on the execute button image, the terminal apparatus 2 may determine that the start instruction has been confirmed. On the other hand, when an input is performed on the back button image, the terminal apparatus 2 may determine that the selection instruction has not been confirmed, erase the instruction confirm window, and go back to the state in which the terminal apparatus 2 is ready to accept a start instruction.

Note that in the present embodiment, the information processing system also counts, as the cumulative grant count, the number of times a game character is granted through a summon that is performed without consuming summon points (e.g., a summon that is performed in exchange for consuming a ticket described above), as well as the number of times a game character is granted through a summon that is performed in exchange for consuming summon points. That is, under certain conditions (e.g., on the condition that a tickets is consumed), the information processing system accepts a selection instruction not in exchange for decreasing summon points and grants a game character corresponding to the selection candidate selected by the selection instruction to the user. Then, the information processing system calculates the cumulative grant count as the sum between the number of times a game character is granted by a selection instruction that is accepted in exchange for consuming summon points and the number of times a game character is granted by a selection instruction that is accepted not in exchange for decreasing summon points. Then, the user can increase the cumulative grant count by a plurality of methods. That is, the user is allowed to choose the method for increasing the cumulative grant count, thus improving the strategic aspect of the game. According to the description above, the number of times a game character has been actually granted and the cumulative grant count can be matched with each other so that the cumulative grant count is a value that is easy to understand for the user. Note that in other embodiments, the information processing system may update the cumulative grant count only when a game character is granted by a selection instruction that is accepted in exchange for consuming summon points, while not updating the cumulative grant count when a game character is granted by a selection instruction that is accepted not in exchange for decreasing summon points.

In the present embodiment, the information processing system counts, as the cumulative grant count, the number of times a game character is granted in one summon game (specifically, the summon game named "SUMMON NEW CHARACTER"), while not counting, as the cumulative grant count, the number of times a game character is granted in other summon games. That is, the information processing system accepts start instructions for starting different normal summon modes, between which the draw probability is varied for at least one game character, updates the cumulative grant count for at least one of the normal summon modes, and updates the cumulative grant count for each normal summon mode. Then, the user can play summon games while giving a consideration as to whether the user should play a particular summon game in an attempt to execute the designated summon mode or should play other summon games in an attempt to obtain a desired game character, thus improving the strategic aspect of the summon game.

[2-1-3. Process Performed when Cumulative Grant Count Becomes Equal to Permit Count]

When the cumulative grant count becomes equal to the permit count while in the normal summon mode, the information processing system permits execution of the designated summon mode. In this case, the terminal apparatus 2 displays, on the display section 24, a permit notification window for notifying the user that execution of the designated summon mode has been permitted (step S4 shown in FIG. 4).

Figure 8:
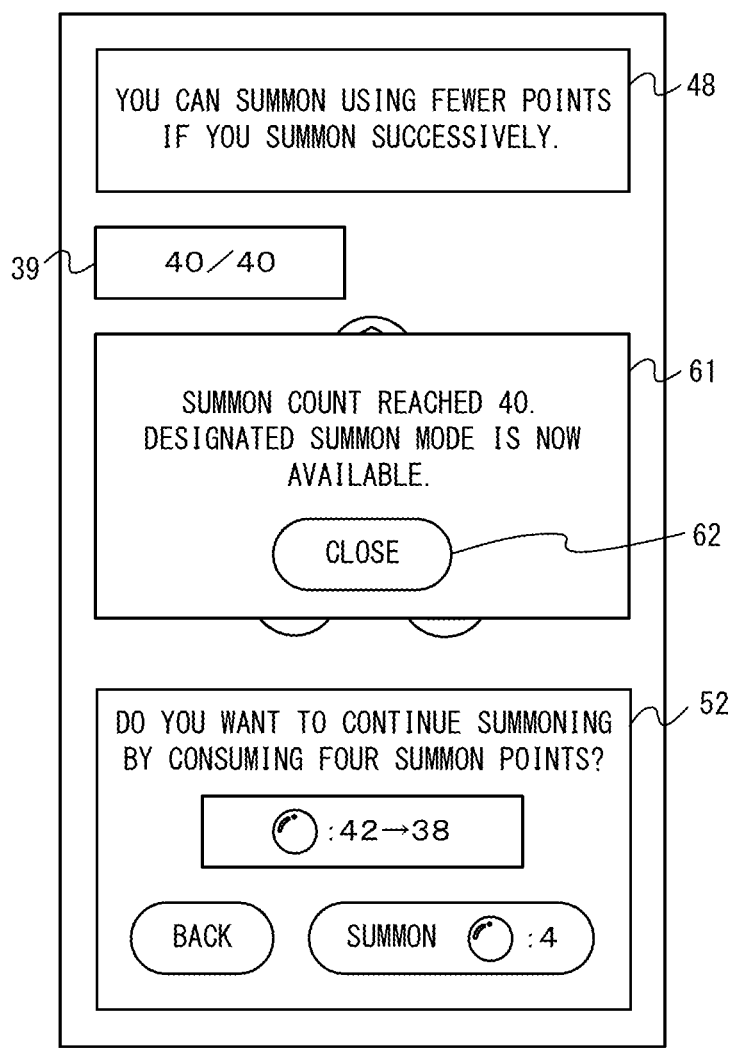
FIG. 8 is a diagram showing an example a non-limiting permit notification window.

FIG. 8 is a diagram showing an example a permit notification window. As shown in FIG. 8, a permit notification window 61 includes a message indicating that execution of the designated summon mode has been permitted (the message "SUMMON COUNT REACHED 40. DESIGNATED SUMMON MODE IS NOW UNLOCKED." in FIG. 8).

Note that in the present embodiment, the permit notification window 61 is displayed superimposed over the candidate selection image after displaying a special effects image that shows the game character selected by the selection instruction by the user being grated to the user.

As described above, in the present embodiment, when the cumulative grant count becomes equal to or greater than a reference count (e.g., the permit count) during an iteration of the normal summon mode, the information processing system notifies the user, while in the iteration of the normal summon mode, that execution of the designated summon mode has been permitted. Thus, the user can learn in the normal summon mode that execution of the designated summon mode has been permitted, and the user can determine whether to continue the normal summon mode or to end the normal summon mode at a point in time when execution of the designated summon mode is permitted.

As shown in FIG. 8, the permit notification window 61 includes a button image 62 used for giving an instruction to close the permit notification window 61. In response to an input performed by the user on the button image 62, the permit notification window 61 is erased.

When the permit notification window 61 is erased, the candidate selection image is displayed on the display section 24. Thus, the terminal apparatus 2 is ready to accept a continue instruction or an end instruction as described above on the continuation confirm window 52. Note that although the continuation confirm window 52 is displayed, together with the permit notification window 61, in the example shown in FIG. 8, the terminal apparatus 2 does not accept an input performed on the button images 53 and 54 of the continuation confirm window 52 while the permit notification window 61 is displayed. After the cumulative grant count becomes equal to the permit count, the information notification window 48 no longer displays a message indicating that execution of the designated summon mode is permitted by performing a number of summons equal to the permit count (i.e., the message "DESIGNATED SUMMON MODE IS UNLOCKED WHEN YOU SUMMON 40 TIMES!") because there is little need to notify the user.

As described above, even after the permit notification window 61 is displayed, just as before the permit notification window 61 is displayed, the user can choose to continue or end the normal summon mode (FIG. 4). Note however that when the five selection candidates of the current iteration of the normal summon mode have all been selected when the permit notification window 61 is displayed, the permit notification window 61 is erased and the normal summon mode is ended. In this case, after ending the normal summon mode, the designated start image to be described below is displayed on the display section 24 (step S5 shown in FIG. 4).

[2-1-4. Designated Summon Mode]

When the normal summon mode is ended after execution of the designated summon mode is permitted in the normal summon mode, the next summon game is executed in the designated summon mode (steps S6 and S7 shown in FIG. 4). In the designated summon mode, from among a plurality of (here, four) particular game characters determined in the game application, a game character that is designated by the user is granted to the user. In the normal summon mode, the user obtains a game character by selecting one selection candidate from a set of selection candidates that have been chosen by a draw while the selection candidates are displayed in such a manner that game characters cannot be uniquely identified (i.e., while attribute symbols thereof are displayed). In contrast, in the designated summon mode, the user obtains a game character by specifying one game character from a set of particular game characters while the game characters are displayed in such a manner that the game characters can be uniquely identified.

Note that in the present embodiment, one or more game characters displayed in the designated summon mode is/are rare character/characters described above. That is, in the normal summon mode, the information processing system displays on the display device a set of selection candidates corresponding to game characters that are chosen by a probability-based draw from among a plurality of game characters including normal characters and rare characters, and in the designated summon mode, the information processing system displays on the display device a rare character or rare characters as one or more game characters displayed in the designated summon mode. That is, in the present embodiment, in the designated summon mode, it is ensured that the user can obtain rare characters, which are more difficult to obtain in the normal summon mode. Thus, it is possible to more strongly motivate the user to perform the designated summon mode (hence to perform the normal summon mode so that execution of the designated summon mode is permitted).

Note that rare characters that can be granted in the normal summon mode do not all need to be presented in the designated summon mode. In the present embodiment, there are five or more rare characters that can be granted in the normal summon mode, whereas four of them are presented in the designated summon mode.

If the normal summon mode is ended after execution of the designated summon mode is permitted, the terminal apparatus 2 displays the designated start image on the display section 24 (step S5 shown in FIG. 4). The designated start image is a user interface image used for accepting a start instruction for starting the designated summon mode from the user. The details of the designated start image will now be described with reference to FIG. 9.

Figure 9:
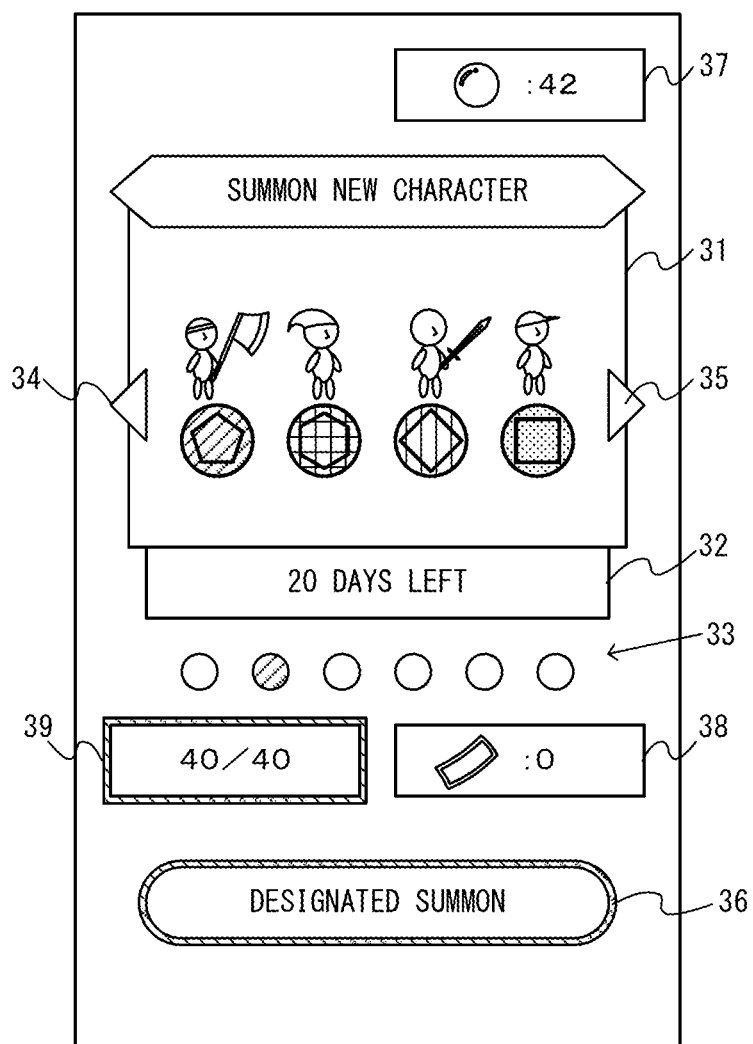
FIG. 9 is a diagram showing an example of a non-limiting designated start image.

FIG. 9 is a diagram showing an example of the designated start image. As shown in FIG. 9, the designated start image includes images 31 to 39 similar to the normal start image (see FIG. 5). Note however that the manner in which the start button image 36 and the cumulative grant count image 39 are displayed in the designated start image is different from that in the normal start image. Specifically, in the designated start image, the start button image 36 and the cumulative grant count image 39 are outlined differently from the normal start image. Thus, the user can recognize that a mode that is different from the normal summon mode (i.e., the designated summon mode) is being executed. The start button image 36 includes a message indicating the designated summon mode (the message "DESIGNATED SUMMON" in FIG. 9). Note that a rare character can be summoned without consuming summon points in the designated summon mode, and this may be indicated by the start button image 36. Therefore, the user can recognize the details of summoning in the designated summon mode.

As described above, in the present embodiment, when the cumulative grant count becomes equal to or greater than a reference count (i.e., the permit count) during an iteration of the normal summon mode, the information processing system notifies that execution of the designated summon mode has been permitted while the information processing system is ready to accept a start instruction in the designated summon mode after the end of the iteration of the normal summon mode. Then, it is possible to reduce the probability of the user forgetting to perform the designated summon mode.

In the present embodiment, the content image 31 included in each start image shows four rare characters, which are the particular game characters described above. Therefore, the user knows rare characters that the user can obtain in the designated summon mode not only after, but also before, the permission of execution of the designated summon mode.

Note that the game characters displayed in the designated summon mode in the present embodiment are particular game characters that are predetermined in the game application, but they do not need to be predetermined. For example, in other embodiments, game characters that have been chosen by a draw from among the rare characters may be displayed in the designated summon mode.

When starting the designated summon mode, the user gives a start instruction by performing an input on the start button image 36. Note that also in the designated summon mode as in the normal summon mode, the user may end the summon game mode by performing an input on a button image used for giving an instruction to display the menu image or on a button image used for giving an instruction to start another game other than summon games.

When a start instruction is given while in a state in which the designated start image is displayed, the designated summon mode is started. Then, first, the terminal apparatus 2 displays a character designation image on the display section 24 (step S6 shown in FIG. 4). The character designation image is a user interface image used for accepting, from the user, a designation instruction for designating one of the particular game characters. The details of the character designation image will now be described with reference to FIG. 10.

Figure 10:
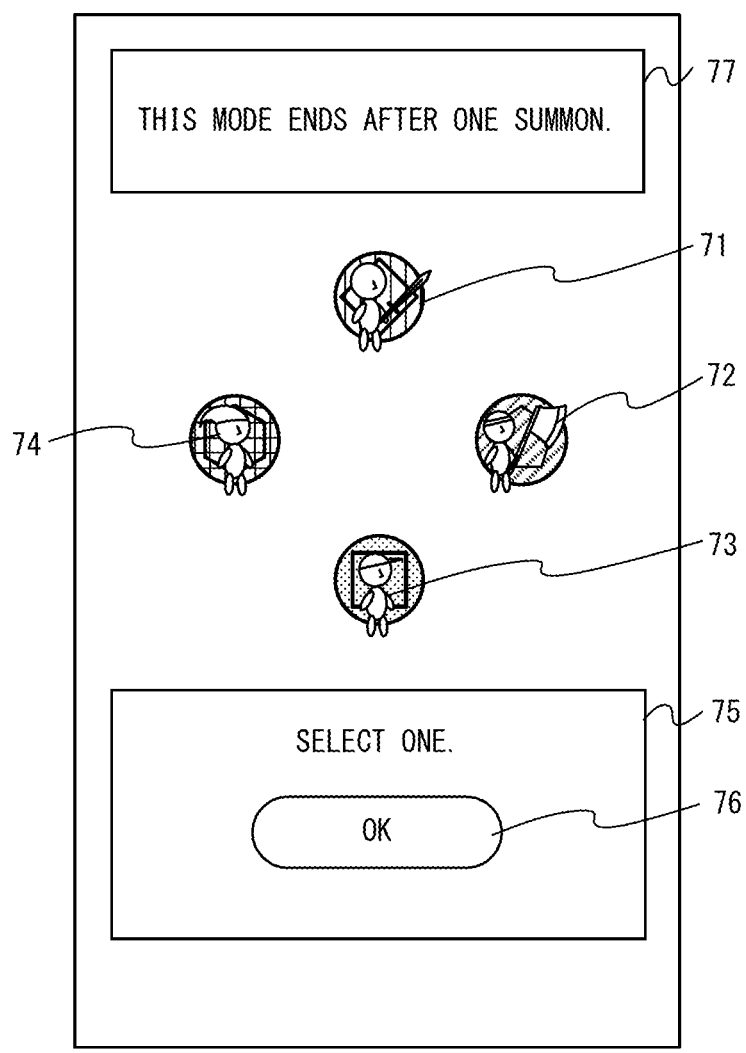
FIG. 10 is a diagram showing an example of a non-limiting character designation image.

FIG. 10 is a diagram showing an example of a character designation image. As shown in FIG. 10, the character designation image includes character images 71 to 74 representing four game characters that can be designated by the user. Thus, in the character designation image, the user can designate a game character while game characters are displayed in such a manner that they can be uniquely identified by the user. Note that in the present embodiment, a character images 71 to 74 include attribute symbol images representing the attributes of the game characters. Therefore, the user can recognize the attribute of each game character when designating the game character.

As shown in FIG. 10, the character designation image includes an instruction window 75. The instruction window 75 includes a message that prompts the user to designate a game character (the message "SELECT ONE" in FIG. 10). The instruction window 75 includes a designation confirm button 76 for giving a designation instruction to designate a game character. While in a state in which the character designation image is displayed, the user gives a designation instruction by first performing an input of designating one of a character images 71 to 74 and further performing an input on the designation confirm button 76. This confirms that a game character has been designated.

As a designation instruction is given by the user, the designated game character is granted to the user (step S7 shown in FIG. 4). Specifically, the terminal apparatus 2 displays on the display section 24 a special effects image that shows the game character being summoned to appear, and grants the game character to the user.

In the present embodiment, the number of game characters that can be designated by the user in the designated summon mode is one. Therefore, when the game character designated by the designation instruction is granted to the user while in a state in which the character designation image is displayed, the designated summon mode is ended and the normal summon mode is executed (see FIG. 4). Note that the character designation image includes an information notification window 77, which includes a message indicating that the number of game characters that can be designated by the user is one (the message "THIS MODE ENDS AFTER ONE SUMMON." in FIG. 10). Therefore, the user can recognize the number of game characters that can be designated in the designated summon mode.

Note that there is no limitation on the number of game characters that can be designated by the user in the designated summon mode. For example, in other embodiments, the user may be allowed to designate a predetermined number (two or more) of game characters from among a plurality of game characters presented in the character designation image.

As described above, in the present embodiment, in the summon game mode, the information processing system executes the designated summon mode, in addition to the normal summon mode in which a game character is granted to the user by a draw. Therefore, even if the user cannot obtain a particular game character in the normal summon mode, it is possible for the user to obtain the particular game character by performing a number of summons equal to the permit count. Thus, since the user performs the normal summon mode while thinking whether or not to keep summoning until the cumulative grant count becomes equal to the permit count, it is possible to improve the strategic aspect of the summon game. In the present embodiment, as the designated summon mode is made more advantageous for the user than the normal summon mode (e.g., it is easier to obtain a rare character), it is possible to motivate the user to perform more summons in the normal summon mode, and to promote the consumption of summon points by the user.

In the present embodiment, when the cumulative grant count becomes equal to or greater than the permit count, the information processing system allows the designated summon mode to be started while prohibiting starting a new iteration of the normal summon mode. More specifically, the information processing system prohibits starting the normal summon mode until completion of the process of granting a game character to the user in the designated summon mode. Therefore, it is possible to prompt the user to immediately perform the designated summon mode without starting a new iteration of the normal summon mode. In the present embodiment, if execution of the designated summon mode is permitted during an iteration of the normal summon mode, the user may possibly forget to play the summon game in the designated summon mode after completion of the iteration of the normal summon mode. In contrast, with the configuration described above, when the user next attempts to play the summon game, the designated summon mode is executed, thereby lowering the possibility.

Note that the present embodiment sets a period in which the summon game can be executed. That is, the information processing system accepts a start instruction to start the normal summon mode and a start instruction to start the designated summon mode within a predetermined period in real time. When a period in which the summon game can be executed is set as described above, it is possible to lower the possibility of the user forgetting to play the summon game in the designated summon mode, so that the user is more likely to play the summon game in the designated summon mode in the period.

In the present embodiment, even after the cumulative grant count becomes equal to or greater than the permit count while in the normal summon mode, the information processing system accepts a selection instruction until the end process of ending the normal summon mode is performed (see FIG. 4). Then, in the state described above, it is possible to allow the user to choose whether to give a selection instruction by continuing the normal summon mode or to end the normal summon mode, thus improving the strategic aspect of the summon game.

Note that in the present embodiment, in the normal summon mode, the information processing system displays selection candidates on the display device in such a manner that a part of the property (e.g., the attribute) is shown for the game characters corresponding to the selection candidates. Therefore, based on the property shown for each selection candidate, the user can guess the game character corresponding to the selection candidate and can determine whether any of the selection candidates may correspond to the game character desired by the user, thus improving the strategic aspect of the summon game in the normal summon mode. In the present embodiment, it is possible to allow the user to choose whether to continue or end the normal summon mode under such circumstances that the user can make such guess and determination, thereby further improving the strategic aspect of the summon game. For example, when the cumulative grant count becomes equal to or greater than the permit count while in the normal summon mode, if there remains a selection candidate that indicates the attribute of the game character desired by the user, the user plays the summon game while thinking whether to continue or end the normal summon mode, thus improving the playability of the summon game.

In the present embodiment, in the normal summon mode, when there is only a few selection candidates that are unselected, the amount of summon points to be consumed is smaller as compared with a case where there are more selection candidates that remain unselected. That is, when the information processing system receives a selection instruction in a state in which the number of unselected selection candidates is equal to the first number (e.g., one), the amount by which a predetermined parameter is decreased (e.g., the amount by which summon points are decreased) for a selection instruction is smaller than that in a state in which the number of unselected selection candidates is equal to the second number (e.g., five) greater than the first number. Therefore, in the present embodiment, when the cumulative grant count becomes equal to or greater than the permit count during an iteration of the normal summon mode, the user can give a consideration as to whether to continue the normal summon mode in order to efficiently make a selection with fewer point consumption or to end the normal summon mode in order to sooner execute the designated summon mode. According to the present embodiment, while the user gives such a consideration, it is possible to allow the user to choose whether to continue or end the normal summon mode, thus improving the strategic aspect of the summon game.

In the present embodiment, game characters that can be granted in the designated summon mode are game characters that can be chosen to be selection candidates by a draw in the normal summon mode. Therefore, according to the present embodiment, even if the user fails to obtain a desired game character in the normal summon mode, it is ensured that the user can obtain the desired game character in the designated summon mode. Therefore, it is possible to more strongly motivate the user to repeatedly perform the normal summon mode.

In the present embodiment, when a game character is granted in the designated summon mode, the user's summon points are not consumed. That is, the information processing system grants to the user the game character designated by the user not in exchange for decreasing summon points. Thus, it is possible to more strongly motivate the user to summon in the normal summon mode until the cumulative grant count becomes equal to the permit count so as to achieve a state in which execution of the designated summon mode is permitted. Note that in other embodiments, a game character may be granted in the designated summon mode in exchange for consuming a predetermined amount of summon points.

In the present embodiment, the information processing system permits execution of the designated mode until the number of times the designated summon mode is executed becomes equal to a predetermined upper limit number of times (here, one time). That is, during a period in which the summon game can be executed, the user can execute the designated summon mode for the predetermined number of times. If the number of times the designated summon mode can be executed were unlimited, the user would be able to obtain an unlimited number of particular game characters (e.g., rare characters) in the designated summon mode. This may possibly lower the value of such game characters, and lower the motivation for performing the normal summon mode, which is the summon game for obtaining such game characters. In contrast, in the present embodiment, there is an upper limit to the number of times the designated summon mode can be executed, thereby reducing the possibility of lowering the motivation for performing the normal summon mode.

After a game character is granted to the user in the designated summon mode, the information processing system ends the designated summon mode. After the designated summon mode is ended, the normal start image is displayed on the terminal apparatus 2 (see FIG. 4). Therefore, even after the designated summon mode is executed, the user can play the summon game in the normal summon mode. Note that when the designated summon mode has been executed, the terminal apparatus 2 does not display the cumulative grant count image in the normal start image. Thus, the information processing system can make the user recognize that the designated summon mode has been executed and cannot be executed again.

[2-2. Changing Draw Method for Choosing Rare Character]

Next, the process of changing the draw method in the normal summon mode will be described. As described above, in the present embodiment, a selection probability is set for each game character that can be granted in the normal summon mode. Here, the information processing system increases the selection probability of rare characters among the game characters under certain conditions. Specifically, the information processing system increases the selection probability of rare characters based on the number of times normal characters have been successively granted (hereinafter referred to as "successive grant count") in the normal summon mode. The process of changing the selection probability will now be described in detail with reference to FIG. 11.

FIG. 11 is a table showing the relationship between the successive grant count and the likelihood of rare characters being chosen. As shown in FIG. 11, when the successive grant count becomes equal to five, the information processing system increases the selection probability for each rare character that can be granted in the normal summon mode by 0.25[%] from the base value. Note that in the present embodiment, it is assumed that the selection probability of each rare character is 3[%], for example. Note however that in other embodiments, the base value of the selection probability does not need to be constant between rare characters, and the base value may vary for each rare character.

Thus, when the successive grant count becomes equal to five in an iteration of the normal summon mode, and then another iteration of the normal summon mode is started, a draw is performed while setting the selection probability of each rare character to be 3.25[%]. That is, in the next iteration of the normal summon mode as compared with the previous iteration of the normal summon mode, a rare character is more likely to be chosen by a draw. Note that since the selection probability increases for each rare character, the selection probability relatively decreases for at least one normal character.

As shown in FIG. 11, each time the successive grant count becomes equal to a probability-increasing count, the information processing system increases the selection probability of each rare character by 0.25[%] from the current value. That is, in the present embodiment, the selection probability of each rare character gradually increases as the successive grant count increases. Note that in the present embodiment, the probability-increasing counts are multiples of five. Note however that there is no limitation on the values of the probability-increasing counts. Although a plurality of values are set as the probability-increasing counts in the present embodiment, only one value may be set as the probability-increasing count in other embodiments.

In the present embodiment, when a rare character is granted to the user in the normal summon mode, the information processing system resets the successive grant count to zero, and the selection probability of rare characters to the base value. Note that if a rare character is chosen by a draw but the user does not select a selection candidate (i.e., an attribute symbol) that corresponds to the rare character so that the rare character is not granted to the user, the selection probability of rare characters is maintained (not reset to the base value) and the successive grant count also is not reset.

As described above, in the present embodiment, the information processing system updates the successive grant count each time a normal character is granted successively in the normal summon mode, and resets the successive grant count when a rare character is granted in the normal summon mode. Then, when the successive grant count becomes equal to a reference count (i.e., the probability-increasing count), the selection probability of rare characters is increased in the normal summon mode, and when the successive grant count is reset, the selection probability is reset. Then, it is possible to motivate the user to continuously play the summon game even when a rare character is not granted to the user in the normal summon mode.

In the present embodiment, when a rare character is granted in the designated summon mode while the selection probability of rare characters has been increased, the information processing system maintains the increased selection probability (that is, the selection probability is not reset to the base value). Where the selection probability of rare characters has been increased in the normal summon mode, if the selection probability is reset to the base value because the designated summon mode is performed, the user may possibly lose motivation to play the summon game. In contrast, in the present embodiment, under such circumstances as described above, the selection probability of rare characters is maintained, and it is possible to lower the possibility of the user losing motivation to play the summon game.

As shown in FIG. 11, if the successive grant count becomes equal to a predetermined capping selection count (here, 120), the information processing system changes the draw method so as to ensure that rare characters will be chosen by a draw. For example, the information processing system performs a draw using only rare characters as objects of the draw. Therefore, if the successive grant count becomes equal to the capping selection count during an iteration of the normal summon mode, it is ensured, in the next iteration of the normal summon mode, that rare characters will be chosen by a draw so that the five selection candidates are all rare characters. Therefore, also in such a case, as in the designated summon mode, it is ensured that the user can obtain a rare character. Note that in this case, when a rare character is granted to the user, the draw method is switched back to the original draw method, and the successive grant count is also reset to zero.

As described above, in the present embodiment, on the condition that the successive grant count has become equal to or greater than a reference count (i.e., the capping selection count), the information processing system displays a predetermined number (e.g., five) of selection candidates each corresponding to a rare character on the display device. Then, it is possible to motivate the user to continuously play the summon game even when a rare character is not granted to the user in the normal summon mode.

Note that in other embodiments, the information processing system does not need to increase the selection probabilities of all rare characters based on the successive grant count. For example, in other embodiments, the information processing system may increase the selection probabilities of those rare characters that can be designated by the user in the designated summon mode based on the successive grant count, or may increase the selection probabilities of rare characters other than those rare characters that can be designated by the user in the designated summon mode based on the successive grant count.

3. Specific Example of Process in Information Processing System

Next, referring to FIG. 12 to FIG. 17, a specific example of information processes in the information processing system will be described.

[3-1. Data Used in Information Processes]

Figure 12:
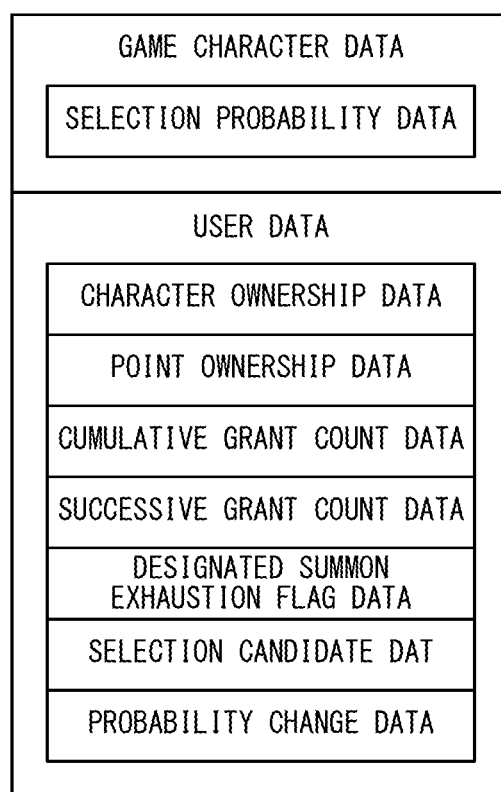
FIG. 12 is a diagram showing an example of various data to be used in information processing in a non-limiting information processing system.

FIG. 12 is a diagram showing an example of various data used in information processes in the information processing system. The data shown in FIG. 12 are stored in the storage section 12 of the server 1 (or the memory of the processing section 11), for example.

As shown in FIG. 12, the server 1 stores game character data related to each game character used in the game. The game character data includes selection probability data that represents the selection probability (more specifically, the base value of the selection probability) set for each game character. Although not shown, the game character data includes data that represents the ability, the attribute, etc., of each game character.

As shown in FIG. 12, the server 1 stores user data related to the user of the game application. Although not shown, user data is stored for each user who uses the game application.

The user data includes character ownership data and point ownership data. The character ownership data represents game characters owned by the user in the game application. The point ownership data represents the amount of summon points owned by the user in the game application. Note that in addition to these data, the user data may also include data that represents items owned by the user (e.g., tickets, etc.). The user data may include data that is used in a game other than the summon game in the game application.

The user data includes cumulative grant count data that represents the cumulative grant count. The user data also includes successive grant count data that represents the successive grant count. The user data also includes designated summon exhaustion flag data. The designated summon exhaustion flag data is flag data that indicates whether or not the user has already executed the designated summon mode.

The user data includes selection candidate data. The selection candidate data represents selection candidates currently being presented to the user in the normal summon mode. Specifically, the selection candidate data indicates, for each selection candidate, the attribute indicated by the selection candidate, the game character corresponding to the selection candidate, whether or not the selection candidate has been selected, etc.

The user data includes probability change data. The probability change data indicates whether or not the selection probability of game characters (specifically, rare characters) has been changed, and if so, the change.

Note that other than data shown in FIG. 12, the server 1 stores a server-side game program. The server-side game program is a program used for executing a game process executed on the server 1 (the server process shown in FIG. 15). That is, the processing section 11 of the server 1 executes the server-side game program, thereby executing the server process (see FIG. 15) to be described below on the server 1.

The terminal apparatus 2 stores a terminal-side game program. The terminal-side game program is a program used for executing a game process executed on the terminal apparatus 2 (the terminal-side summon game process shown in FIG. 13). That is, the processing section 21 of the terminal apparatus 2 executes the terminal-side game program, thereby executing the terminal-side summon game process (see FIG. 13) to be described below on the terminal apparatus 2.

Note that the terminal apparatus 2 may store a part or whole of the various data (see FIG. 12) stored in the server 1 for use in the execution of the terminal-side summon game process. Data used in the information processing system may be stored either in the server 1 or in the terminal apparatus 2. Note that where the same data are stored in the server 1 and in the terminal apparatus 2, the data stored in the server 1 and the data stored in the terminal apparatus 2 are synchronized with each other with appropriate timing.

[3-2. Process in Terminal Apparatus]

Figure 13:
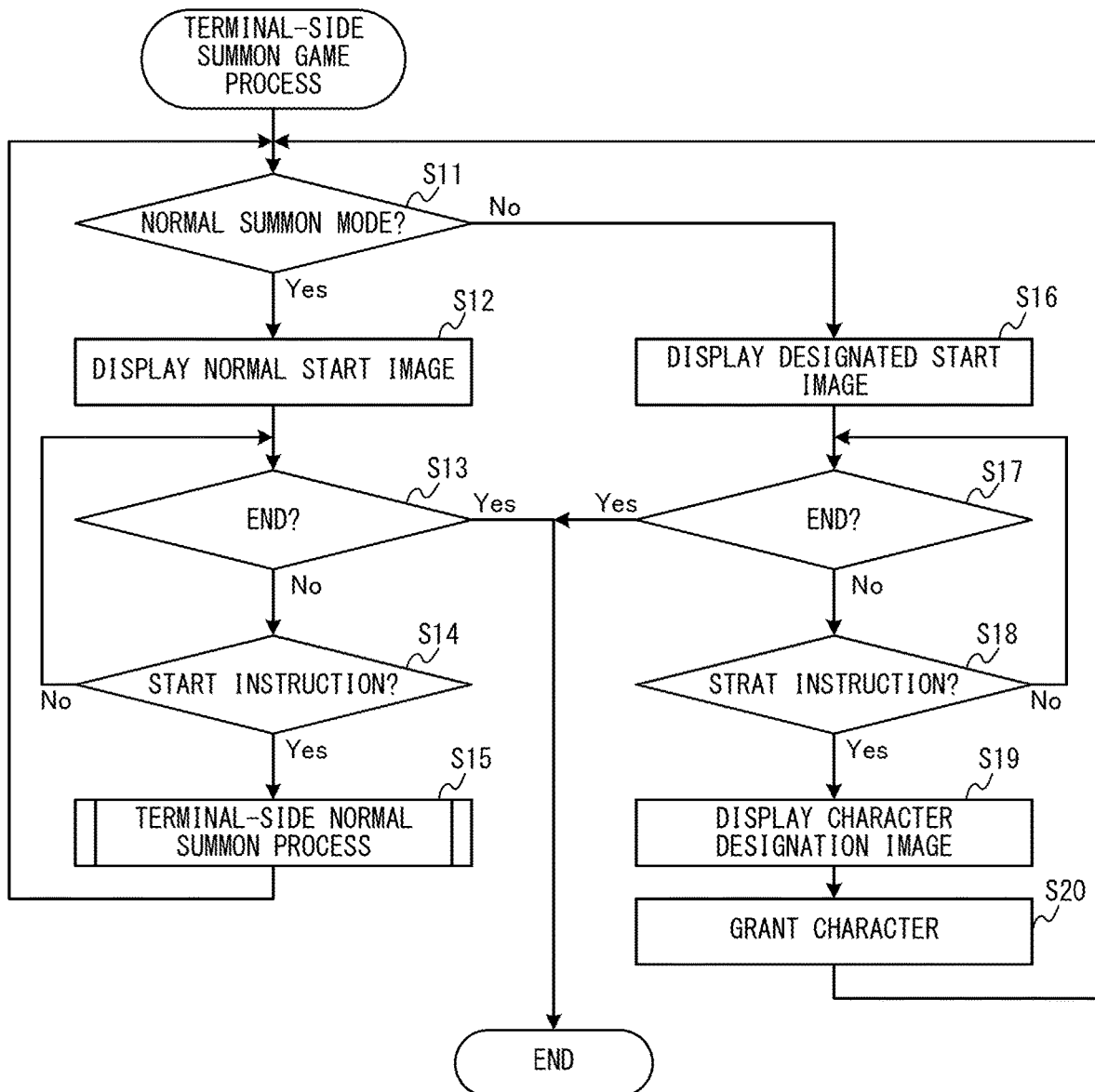
FIG. 13 is a flow chart showing an example of a flow of a terminal-side summon game process to be executed by a non-limiting terminal apparatus.

FIG. 13 is a flow chart showing an example of the flow of the terminal-side summon game process executed by the terminal apparatus. Note that the terminal-side summon game process shown in FIG. 13 is started in response to a switch instruction performed by the user so that an image related to the particular summon game described above (that is, the summon game named "SUMMON NEW CHARACTER") is displayed as the start image in the summon game mode during the execution of the terminal-side game program stored in the storage section 22.

Note that in the present embodiment, it is assumed that the CPU (in other words, the processor) of the processing section 11 of the server 1 or the processing section 21 of the terminal apparatus 2 executes the game program stored in the storage section 12 or 22, thereby executing the processes of the steps shown in FIG. 13 to FIG. 17. Note however that in other embodiments, some of the processes of the steps described above may be executed by another processor (e.g., a dedicated circuit, or the like) different from the CPU. Where the terminal apparatus 2 can communicate with the server 1, some of the processes of the steps shown in FIG. 13 and FIG. 14 may be executed in the server 1. Some of the processes of the steps shown in FIG. 15 to FIG. 17 may be executed in the terminal apparatus 2. The processes of the steps shown in FIG. 13 to FIG. 17 are merely illustrative, and the order of steps to be performed may be switched around or other processes may be executed in addition to (or instead of) the processes of the steps, as long as similar results are obtained.

Figure 14:
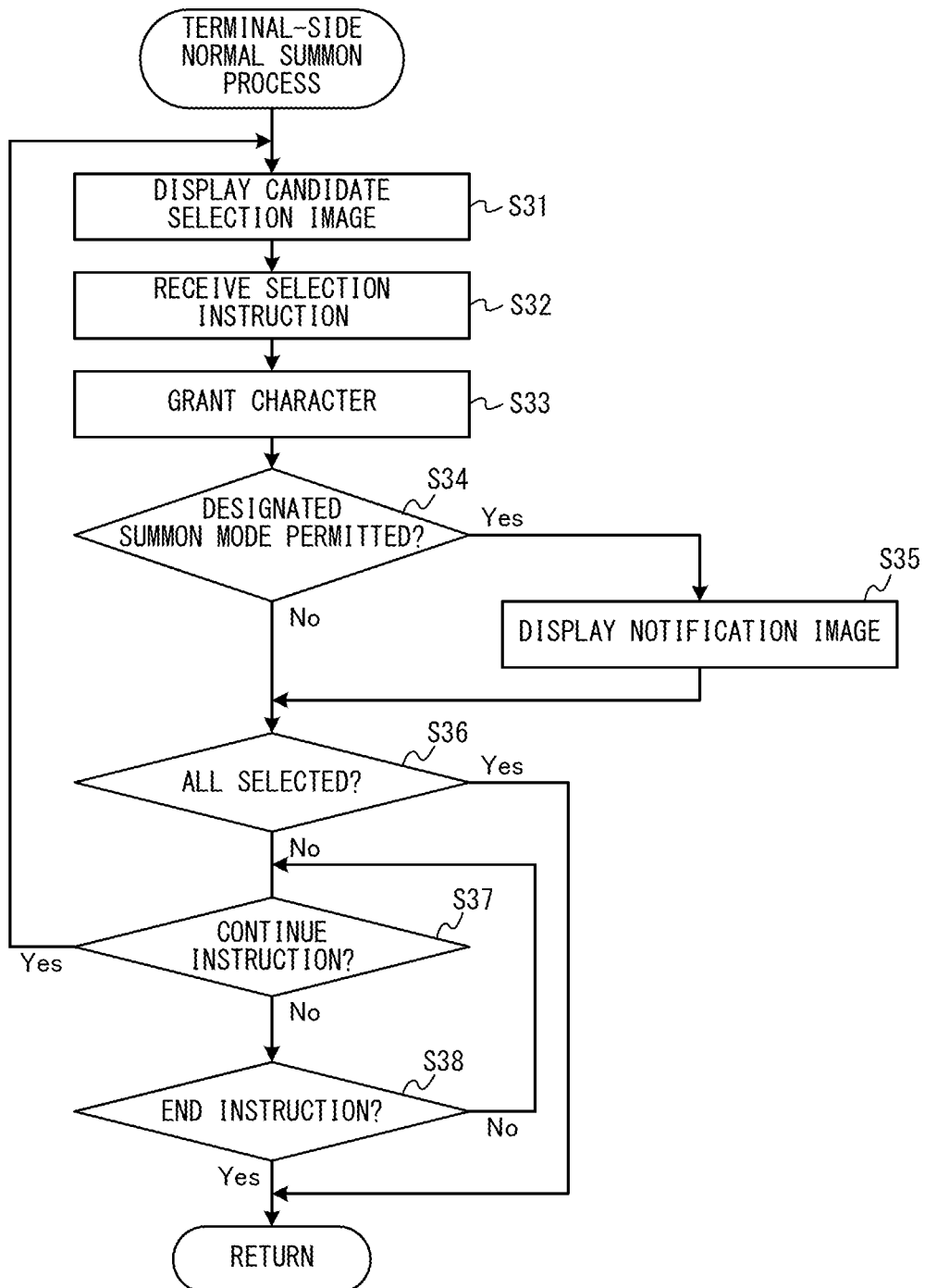
FIG. 14 is a sub-flow chart showing an example of a detailed flow of a terminal-side normal summon process of step S15 shown in FIG. 13.

The processing section 21 of the terminal apparatus 2 executes the processes of the steps shown in FIG. 13 and FIG. 14 using a memory (or the storage section 22). That is, the CPU of the processing section 21 stores data obtained in the process steps in the memory, and when using the data in subsequent process steps, the CPU reads out and uses the data from the memory. Similarly, the processing section 11 of the server 1 executes the processes of the steps shown in FIG. 15 to FIG. 17 using a memory (or the storage section 12). That is, the CPU of the processing section 11 stores data obtained in the process steps in the memory, and when using the data in subsequent process steps, the CPU reads out and uses the data from the memory.

In the terminal-side summon game process shown in FIG. 13, first, in step S11, the processing section 21 determines whether to execute the normal summon mode. In this process, the processing section 21 transmits to the server 1 a start notification that indicates that the particular summon game has been started. The server 1 receives the start notification and transmits to the terminal apparatus 2 a mode notification that indicates whether to execute the normal summon mode or to execute the designated summon mode (steps S43 and S44 to be described below). The processing section 21 receives the mode notification and determines, based on the received mode notification, whether to execute the normal summon mode or to execute the designated summon mode. The mode notification may include information that represents the number of points owned by the user and/or information that represents the cumulative grant count. If the determination result of step S11 is affirmative (that is, when executing the normal summon mode), the process of step S12 is executed. On the other hand, if the determination result of step S11 is negative (that is, when executing the designated summon mode), the process of step S16 is executed.

In step S12, the processing section 21 generates and displays a normal start image (see FIG. 5) on the display section 24. For example, the processing section 21 generates a normal start image based on information included in the mode notification. With the normal start image displayed, the terminal apparatus 2 is ready to accept the start instruction, etc. The process of step S13 is executed, following step S12.

In step S13, the processing section 21 determines whether or not to end the particular summon game. Specifically, while the normal start image is displayed, the processing section 21 determines whether the user has given a switch instruction to select a different summon game, an instruction to end the summon game mode or an instruction to start another game other than a summon game. If the determination result of step S13 is negative, the process of step S14 is executed. On the other hand, if the determination result of step S13 is affirmative, the processing section 21 ends the terminal-side summon game process shown in FIG. 13.

Note that for a different summon game other than the particular summon game described above, similar processes to the series of processes shown in FIG. 13 to FIG. 17 may be executed (except that different game characters can be granted). For a different summon game, if the designated summon mode is not executed, the terminal apparatus 2 and the server 1 may execute only processes, of the series of processes shown in FIG. 13 to FIG. 17, that are related to the normal summon mode.

In step S14, the processing section 21 determines whether the user has given a start instruction to start the normal summon mode. If the determination result of step S14 is affirmative, the process of step S15 is executed. On the other hand, if the determination result of step S14 is negative, the process of step S13 is executed again. Thereafter, the processes of steps S13 and S14 are executed repeatedly until an instruction is given by the user on the normal start image.

In step S15, the processing section 21 executes a terminal-side normal summon process. The terminal-side normal summon process is a process for executing the summon game in the normal summon mode on the terminal apparatus 2. Referring now to FIG. 14, the detailed flow of the terminal-side normal summon process will be described.

FIG. 14 is a sub-flow chart showing an example of the detailed flow of the terminal-side normal summon process of step S15 shown in FIG. 13. In the terminal-side normal summon process, first, in step S31, the processing section 21 generates and displays a candidate selection image (see FIG. 6 and FIG. 7) on the display section 24. Thus, the processing section 21 is ready to accept a selection instruction as described above.

Note that when first generating a candidate selection image (that is, when generating a candidate selection image including five attribute symbols), the processing section 21 transmits to the server 1 a draw request to perform a draw. The server 1 having received a draw request performs a draw to choose five game characters, and transmit to the terminal apparatus 2 selection candidate information that represents selection candidates corresponding to the chosen game characters steps S63 and S64 to be described below). The selection candidate information includes information that represents attributes of attribute symbols, which are selection candidates, for example. The selection candidate information may include information that represents the number of points currently owned and the cumulative grant count. The processing section 21 receives selection candidate information and generates a candidate selection image based on the received selection candidate information.

When generating a candidate selection image again in response to a continue instruction that is given after a selection candidate is selected, the processing section 21 generates the candidate selection image so as to include a character image representing the game character corresponding to the selected attribute symbol instead of the attribute symbol itself. The process of step S32 is executed, following step S31.

In step S32, the processing section 21 receives from the user a selection instruction to select one of the selection candidates included in the candidate selection image. In this process, the processing section 21 transmits to the server 1 selection information that represents the selection candidate selected by the selection instruction. Thus, it is possible to recognize, also on the server 1 side, the selection candidate selected by the user. The process of step S33 is executed, following step S32.

In step S33, the processing section 21 grants the game character selected by the selection instruction to the user.

Here, the server 1 having received the selection information transmits to the terminal apparatus 2 granted character information that represents the game character corresponding to the selection candidate represented by the selection information (step S66 to be described below). The granted character information includes information that is for using the game character in the game (e.g., information that represents a parameter of the ability of the game character, etc.). The processing section 21 receives the granted character information from the server 1, and grants the game character represented by the received granted character information to the user. Specifically, the processing section 21 displays on the display section 24 a special effects image that shows the game character being summon to appear. The process of step S34 is executed, following step S33.

In step S34, the processing section 21 determines whether execution of the designated summon mode has been permitted. As will be later described in detail, as a result of granting the game character to the user, if the cumulative grant count is equal to or greater than the permit count, the server 1 transmits a permit notification to the terminal apparatus 2 (step S71 to be described below), and if the cumulative grant count is less than the permit count, the server 1 transmits a non-permit notification to the terminal apparatus 2 (step S70 to be described below). Therefore, based on whether a permit notification or a non-permit notification is received from the server 1, the processing section 21 determines whether execution of the designated summon mode has been permitted. If the determination result of step S34 is affirmative, the process of step S35 is executed. On the other hand, if the determination result of step S34 is negative, the process of step S36 is executed, skipping the process of step S35.

In step S35, the processing section 21 displays a permit notification window on the display section 24 (see FIG. 8). Then, if the user gives an instruction to close the permit notification window, the processing section 21 erases the permit notification window and displays the candidate selection image on the display section 24. The process of step S36 is executed, following step S35.

In step S36, the processing section 21 determines whether the selection candidates included in the candidate selection image have all been selected. If the determination result of step S36 is negative, the process of step S37 is executed. On the other hand, if the determination result of step S36 is affirmative, the processing section 21 ends the terminal-side normal summon process.

In step S37, the processing section 21 determines whether the user has given a continue instruction to continue the normal summon mode. If the determination result of step S37 is affirmative, the process of step S31 is executed again. On the other hand, if the determination result of step S37 is negative, the process of step S38 is executed.

In step S38, it is determined whether the user has given an end instruction to end the normal summon mode. If the determination result of step S38 is affirmative, the processing section 21 ends the terminal-side normal summon process. On the other hand, if the determination result of step S38 is negative, the process of step S37 is executed again. Thereafter, the processes of steps S37 and S38 are executed repeatedly until a continue instruction or an end instruction is given.

Note that when the continue instruction is given, the processing section 21 transmits to the server 1 a continue notification indicating that the normal summon mode is to be continued. When the end instruction is given, the processing section 21 transmits to the server 1 an end notification indicating that the normal summon mode is to be ended. Thus, it is possible to recognize, also on the server 1 side, whether to continue or end the normal summon mode.

Referring back to FIG. 13, in step S16, the processing section generates and displays a designated start image (see FIG. 9) on the display section 24. For example, the processing section 21 generates the designated start image based on information included in the mode notification. As the designated start image is displayed, the terminal apparatus 2 is ready to accept a start instruction, etc., as described above. The process of step S17 is executed, following step S16.

In step S17, the processing section 21 determines whether or not to end the particular summon game. The determination process of step S17 is similar to the determination process of step S13. If the determination result of step S17 is negative, the process of step S18 is executed. On the other hand, if the determination result of step S17 is affirmative, the processing section 21 ends the terminal-side summon game process shown in FIG. 13.

In step S18, the processing section 21 determines whether the user has given a start instruction to start the designated summon mode. If the determination result of step S18 is affirmative, the process of step S19 is executed. On the other hand, if the determination result of step S18 is negative, the process of step S17 is executed again. Thereafter, the processes of steps S17 and S18 are executed repeatedly until any instruction is given by the user on the designated start image.

In step S19, the processing section 21 generates and displays a character designation image (see FIG. 10) on the display section 24. Thus, the processing section 21 is ready to accept a designation instruction as described above. The process of step S20 is executed, following step S19.

In step S20, the processing section 21 grants the game character designated by the designation instruction to the user. Specifically, in response to a designation instruction given by the user to designate one of the particular game characters shown in the character designation image, the processing section 21 transmits designated character information that represents the designated game character to the server 1. The server 1 having received the designated character information transmits to the terminal apparatus 2 granted character information related to the game character represented by the designated character information (step S50 to be described below). The processing section 21 receives the granted character information from the server 1, and grants the game character represented by the received granted character information to the user. Specifically, the processing section 21 displays on the display section 24 a special effects image that shows the game character being summon to appear. The process of step S11 is executed again, following step S20.

[3-3. Process in Server]

Figure 15:
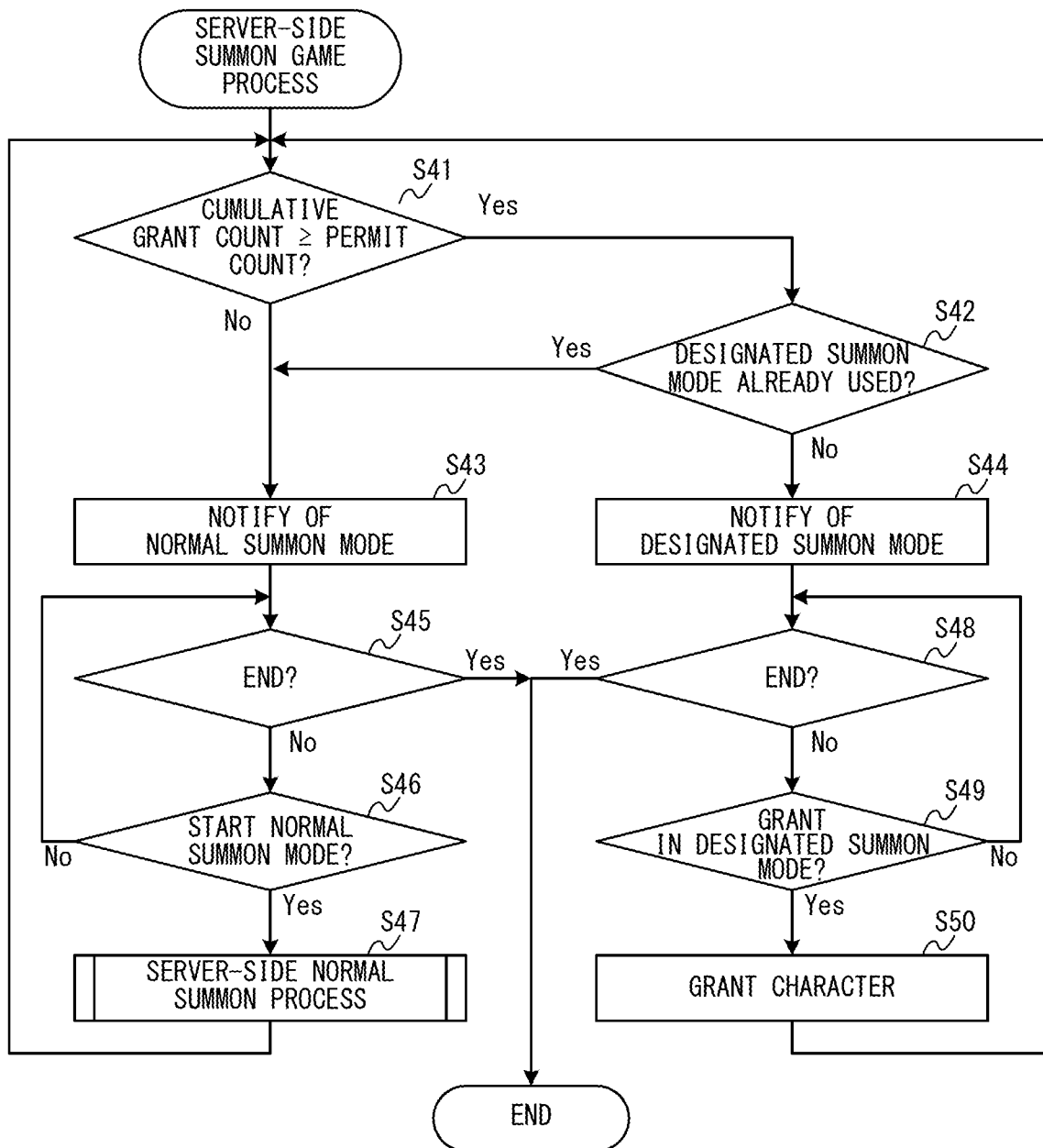
FIG. 15 is a flow chart showing an example of a flow of a server-side summon game process to be executed by a server.

FIG. 15 is a flow chart showing an example of the flow of the server-side summon game process executed by the server 1. Note that the series of processes shown in FIG. 15 is started in response to the terminal apparatus 2 transmitting a start notification that indicates that the particular summon game has been started (step S11) and the server 1 receiving the start notification.

In the server-side summon game process shown in FIG. 15, first, in step S41, the processing section 11 determines whether the cumulative grant count represented by the cumulative grant count data stored in the server 1 is equal to or greater than the permit count. If the determination result of step S41 is affirmative, the process of step S42 is executed. On the other hand, if the determination result of step S41 is negative, the process of step S43 is executed.

In step S42, the processing section 11 determines whether the designated summon mode has been already executed. The determination can be made by referring to the designated summon exhaustion flag data stored in the server 1. Note that it is assumed that in the initial state before execution of the particular summon game, the designated summon exhaustion flag data is set so as to indicate that the designated summon mode has not been executed. If the determination result of step S42 is affirmative, the process of step S43 is executed. On the other hand, if the determination result of step S42 is negative, the process of step S44 is executed.

In step S43, the processing section 11 transmits to the terminal apparatus 2 a mode notification that indicates execution of the normal summon mode. Thus, in the terminal apparatus 2, execution of the normal summon mode is started (step S12). The process of step S45 is executed, following step S43.

On the other hand, in step S44, the processing section 11 transmits to the terminal apparatus 2 a mode notification that indicates execution of the designated summon mode. Therefore, in the terminal apparatus 2, execution of the designated summon mode is started (step S16). The process of step S48 to be described below is executed, following step S44.

In step S45, the processing section 11 determines whether or not to end the particular summon game. Here, if it is determined in step S13 to end the particular summon game, the terminal apparatus 2 transmits to the server 1 a notification that indicates ending of the summon game. When the notification is received from the terminal apparatus 2, the processing section 11 determines to end the particular summon game. If the determination result of step S45 is affirmative, the processing section 11 ends the server-side summon game process shown in FIG. 15. On the other hand, if the determination result of step S45 is negative, the process of step S46 is executed.

In step S46, the processing section 11 determines whether or not to start the normal summon mode. This determination is made by determining whether a draw request as described above has been received from the terminal apparatus 2. If the determination result of step S46 is affirmative, the process of step S47 is executed. On the other hand, if the determination result of step S46 is negative, the process of step S45 is executed again.

Figure 16:
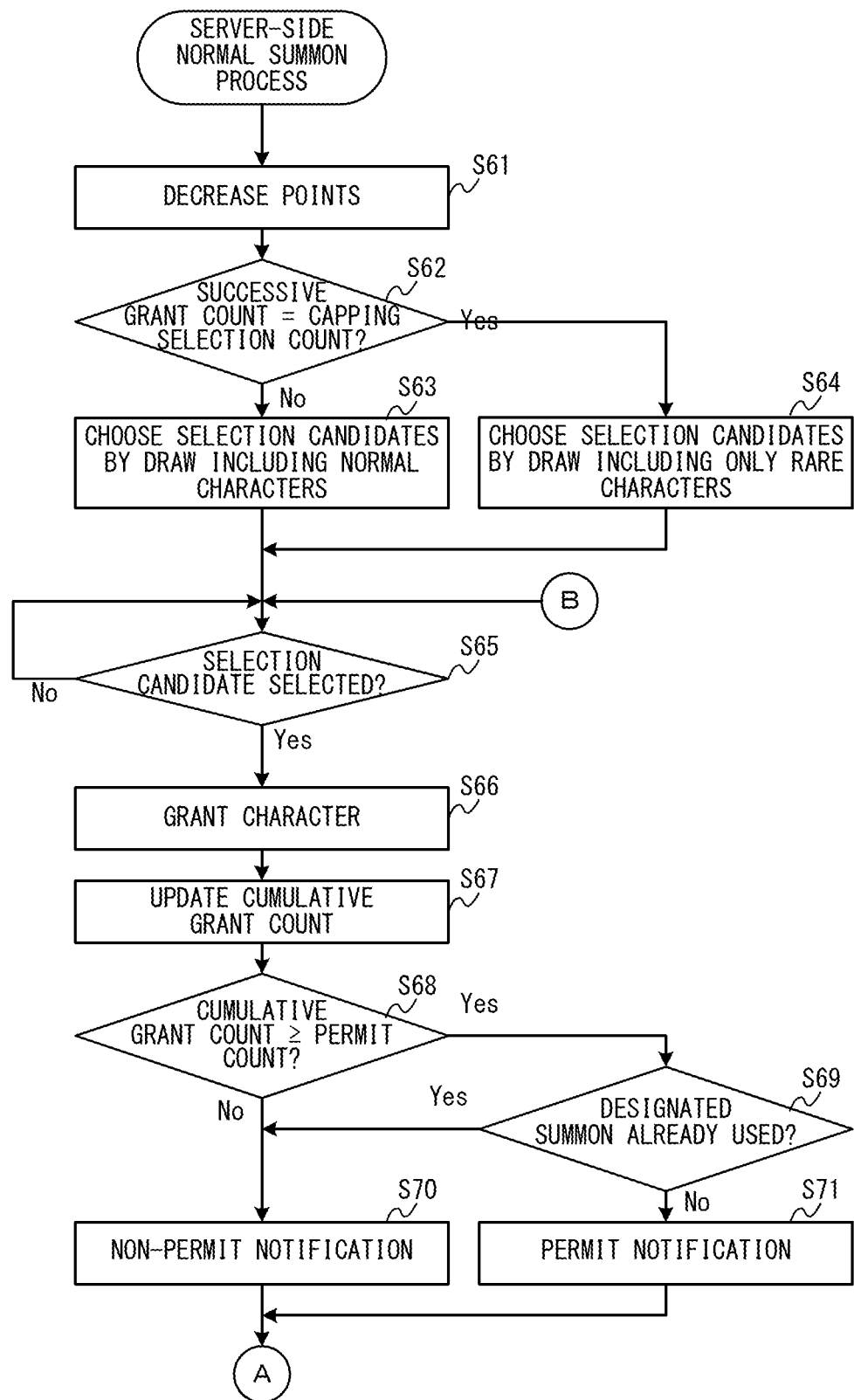
FIG. 16 is a sub-flow chart showing an example of a detailed flow of a server-side normal summon process of step S47 shown in FIG. 15.
Figure 17:
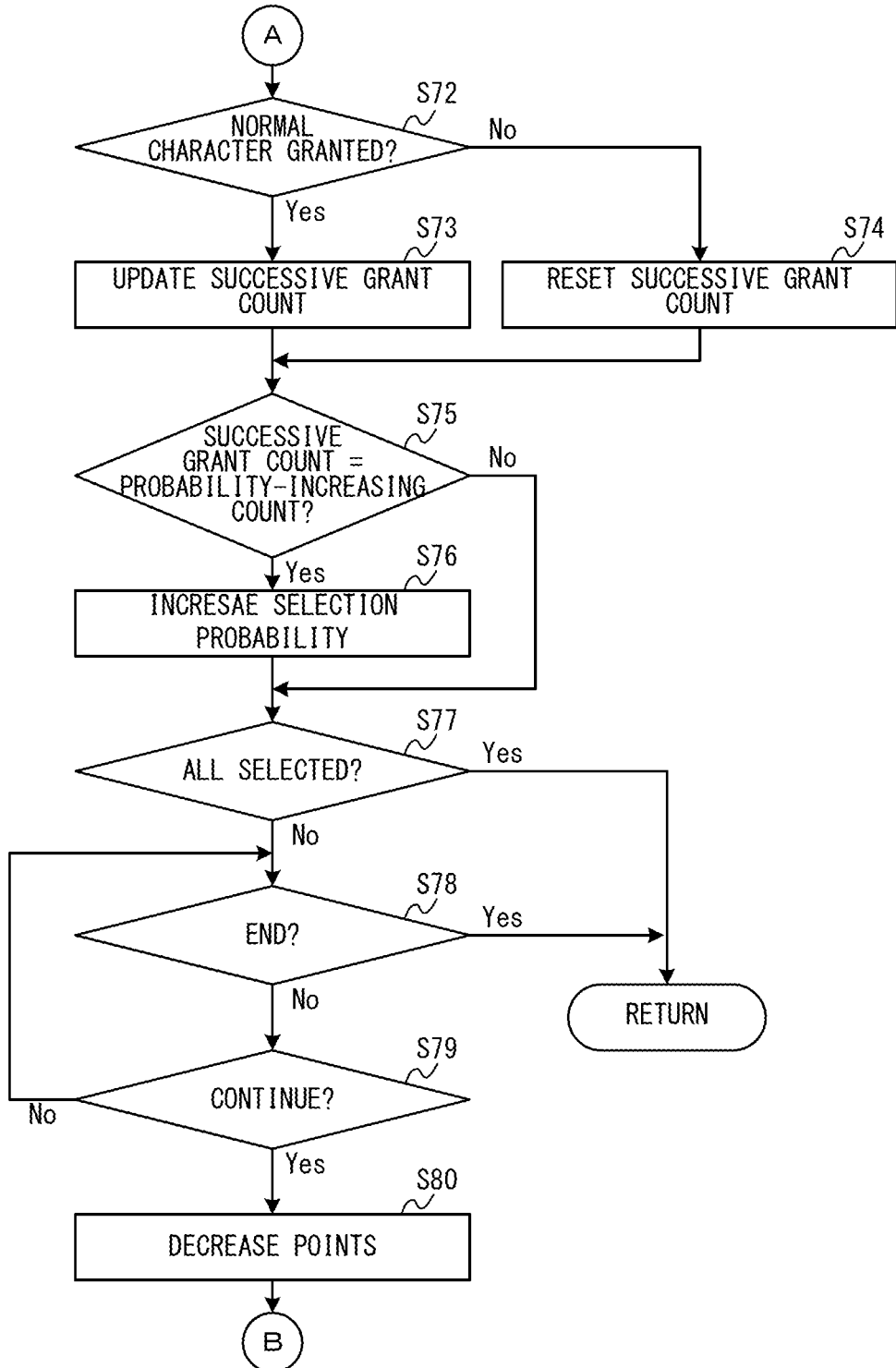
FIG. 17 is a sub-flow chart showing an example of a detailed flow of a server-side normal summon process of step S47 shown in FIG. 15.

In step S47, the processing section 11 executes the server-side normal summon process. The server-side normal summon process is a process of executing the summon game in the normal summon mode on the server 1. Referring now to FIG. 16 and FIG. 17, the detailed flow of the server-side normal summon process will be described.

FIG. 16 and FIG. 17 are sub-flow charts showing an example of the detailed flow of the server-side normal summon process of step S47 shown in FIG. 15. In the server-side normal summon process, first, in step S61, the processing section 11 decreases the summon points owned by the user by a predetermined amount (here, five). That is, the processing section 11 updates the value represented by the point ownership data stored in the server 1 by subtracting five from the value. Note that when the start instruction is given in exchange for consuming a ticket, the processing section 11 updates data that represents the number of tickets owned by the user, instead of updating the point ownership data. The process of step S62 is executed, following step S61.

In step S62, the processing section 11 determines whether the successive grant count represented by the successive grant count data stored in the server 1 is equal to or greater than the capping selection count described above. If the determination result of step S62 is negative, the process of step S63 is executed. On the other hand, if the determination result of step S62 is affirmative, the process of step S64 is executed.

In step S63, the processing section 11 chooses game characters that are to be selection candidates by drawing game characters from a set of game characters that includes normal characters. Note that the draw is performed according to the method described in "[2-1-2. Selection of selection candidates]" above. In this process, the processing section 11 determines the selection probability of each game character based on the selection probability data and the probability change data stored in the server 1, and then performs the draw. The processing section 11 transmits to the terminal apparatus 2 selection candidate information that represents selection candidates (i.e., attribute symbols) corresponding to the chosen game characters. Moreover, the processing section 11 updates the selection candidate data stored in the server 1 so that the selection candidate data represents the new selection candidates, which have been determined by the draw described above. The process of step S65 is executed, following step S63.

In step S64, the processing section 11 chooses game characters that are to be selection candidates by drawing game characters from a set of game characters that includes only rare characters. Thus, in step S64, all of the selection candidates always correspond to rare characters. Note that the specific process of step S64 is similar to the process of step S63 except that all of the selection candidates always correspond to rare characters.

In step S65, the processing section 11 determines whether the user has selected one of the selection candidates. Here, as described above, when the terminal apparatus 2 receives a selection instruction from the user that selects one of the selection candidates included in the candidate selection image, the terminal apparatus 2 transmits to the server 1 selection information that represents the selection candidate that is selected by the selection instruction (step S33). The processing section 11 determines whether the user has selected one of the selection candidates based on whether or not the selection information has been received from the terminal apparatus 2. If the determination result of step S65 is affirmative, the process of step S66 is executed. If the determination result of step S65 is negative, the process of step S65 is executed. That is, the server 1 waits until the selection information is received from the terminal apparatus 2.

In step S66, the processing section 11 grants a game character that corresponds to the selected selection candidate to the user. As an example of the granting, the processing section 11 transmits to the terminal apparatus 2 the granted character information representing a game character that corresponds to the selection candidate represented by the selection information received from the terminal apparatus 2. The processing section 11 updates the character ownership data stored in the server 1 so as to include this game character. This means that the game character has been granted to the user. The processing section 11 updates the selection candidate data stored in the server 1 so that the selected selection candidate is indicated as selected. The process of step S67 is executed, following step S66.

In step S67, the processing section 11 updates the cumulative grant count. That is, the processing section 11 updates the value represented by the cumulative grant count data stored in the server 1 by adding one to the value. The process of step S68 is executed, following step S67.

In step S68, the processing section 11 determines whether the cumulative grant count is equal to or greater than the permit count. The process of step S68 is similar to the process of step S41. If the determination result of step S68 is affirmative, the process of step S69 is executed. On the other hand, if the determination result of step S68 is negative, the process of step S70 is executed.

In step S69, the processing section 11 determines whether the designated summon mode has been already executed. The process of step S69 is similar to the process of step S42. If the determination result of step S69 is affirmative, the process of step S70 is executed. On the other hand, if the determination result of step S69 is negative, the process of step S71 is executed.

In step S70, the processing section 11 transmits to the terminal apparatus 2 the permit notification indicating that execution of the designated summon mode has been permitted. Thus, execution of the designated summon mode is permitted on the terminal apparatus 2. The process of step S72 (see FIG. 17) is executed, following step S70.

On the other hand, in step S71, the processing section 11 transmits to the terminal apparatus 2 the non-permit notification indicating that execution of the designated summon mode has not been permitted. In this case, execution of the designated summon mode is prohibited on the terminal apparatus 2. The process of step S72 (see FIG. 17) is executed, following step S71.

In step S72 shown in FIG. 17, the processing section 11 determines whether the game character granted in step S66, is a normal character. If the determination result of step S72 is affirmative, the process of step S73 is executed. On the other hand, if the determination result of step S72 is negative, the process of step S74 is executed.

In step S73, the processing section 11 updates the successive grant count. That is, the processing section 11 updates the value represented by the successive grant count data stored in the server 1 by adding one to the value. The process of step S75 is executed, following step S73.

On the other hand, in step S74, the processing section 11 resets the successive grant count. That is, the processing section 11 updates the value represented by the successive grant count data stored in the server 1 to zero. The process of step S75 is executed, following step S74.

In step S75, the processing section 11 determines whether the successive grant count represented by the successive grant count data stored in the server 1 has become equal to the probability-increasing count. If the determination result of step S75 is affirmative, the process of step S76 is executed. On the other hand, if the determination result of step S75 is negative, the process of step S77 is executed, skipping the process of step S76.

In step S76, the processing section 11 increases the selection probability of rare characters. Specifically, the probability change data stored in the server 1 is updated in accordance with the current successive grant count (see FIG. 11). As described above, in the draw process of step S63, the selection probability of each game character is set based on the selection probability data and the probability change data stored in the server 1. Therefore, as the selection probability is increased in the process of step S76, a rare character is more likely to be chosen in the next draw process. The process of step S77 is executed, following step S76.

In step S77, the processing section 11 determines whether all of the selection candidates have been selected in the current iteration of the normal summon mode by referring to the selection candidate data stored in the server 1. If the determination result of step S77 is negative, the process of step S78 is executed. On the other hand, if the determination result of step S77 is affirmative, the processing section 11 ends the server-side normal summon process.

In step S78, the processing section 11 determines whether or not to end the normal summon mode. Specifically, the processing section 11 determines whether the end notification described above has been received from the terminal apparatus 2. If the determination result of step S78 is affirmative, the processing section 11 ends the server-side normal summon process. On the other hand, if the determination result of step S78 is negative, the process of step S79 is executed.

In step S79, the processing section 11 determines whether or not to continue the normal summon mode. Specifically, the processing section 11 determines whether the continue notification described above has been received from the terminal apparatus 2. If the determination result of step S79 is affirmative, the process of step S80 is executed. On the other hand, if the determination result of step S79 is negative, the process of step S78 is executed again. Thereafter, the processes of steps S78 and S79 are executed repeatedly until it is determined to end or continue the normal summon mode.

In step S80, the processing section 11 decreases the summon points owned by the user by a predetermined amount. That is, the processing section 11 updates the value represented by the point ownership data stored in the server 1 by subtracting the predetermined amount from the value. Note that the predetermined amount is determined based on the number of unselected selection candidates in the current iteration of the normal summon mode (see "[2-1-2. Selection of selection candidates]" above). The process of step S65 is executed again, following step S80.

Referring back to FIG. 15, in step S48, the processing section 11 determines whether or not to end the particular summon game. The process of step S48 is similar to the process of step S45. If the determination result of step S48 is affirmative, the processing section 11 ends the server-side summon game process shown in FIG. 15. On the other hand, if the determination result of step S48 is negative, the process of step S49 is executed.

In step S49, the processing section 11 determines whether or not to grant a game character in the designated summon mode. Here, when the user designates a game character in the designated summon mode, designated character information is transmitted from the terminal apparatus 2 to the server 1 (step S20). Therefore, the processing section 11 can make the determination of step S49 by determining whether the designated character information has been received from the terminal apparatus 2. If the determination result of step S49 is affirmative, the process of step S50 is executed. On the other hand, if the determination result of step S49 is negative, the process of step S48 is executed again.

In step S50, the game character designated by the user is granted to the user. That is, the processing section 11 transmits to the terminal apparatus 2 granted character information related to the game character represented by the designated character information received from the terminal apparatus 2. The processing section 11 updates the character ownership data stored in the server 1 so as to include this game character. This means that the game character has been granted to the user. The processing section 11 updates the designated summon exhaustion flag data stored in the server 1 so as to indicate that the designated summon mode has been already executed. The process of step S41 is executed again, following step S50.

4. Function/Effect of Present Embodiment and Variations

As described above, in the embodiment described above, the information processing system includes the following components:
  a draw mode starter configured to start a draw mode (e.g., the normal summon mode) in response to a first start instruction given by the user (step S43);
  a first display controller configured to, in the draw mode, display on a display device (e.g., the display section 24) two or more selection candidates (e.g., attribute symbols) determined based on a computer-simulated draw and each corresponding to a game character (step S31);
  a first granter configured to, in the draw mode, perform a first grant process, wherein when the user gives a selection instruction to select at least one of selection candidates in a state in which there are unselected selection candidates, the selected selection candidate is indicated as selected and a game character that corresponds to the selected selection candidate is granted to the user in exchange for decreasing a predetermined parameter (e.g., summon points owned by the user) (step S33);
  an ender configured to, in the draw mode, perform an end process of ending the draw mode when an end instruction is given by the user or there is no unselected selection candidate left (step S36, S38) (note that when a new iteration of the draw mode is started in response to the first start instruction after the draw mode is ended by the ender, a new set of selection candidates that are determined by a new computer-simulated draw in the new iteration of the draw mode are displayed on the display device.);
  a counter configured to update a cumulative grant count each time the first grant process is performed in one or more iteration of the draw mode started in response to the first start instruction (step S67);
  a permitter configured to prohibit starting a new iteration of the draw mode and permit execution of a designated mode when the cumulative grant count becomes equal to or greater than a reference count (e.g., the permit count) (step S71);
  a designated mode starter configured to start a designated mode (e.g., the designated summon mode) in response to a second start instruction given by the user (step S44);
  a second display controller configured to, in the designated mode, display on the display device game characters used in a game in such a manner that the user can uniquely identify one or more of the game characters (step S16); and
  a second granter configured to, in the designated mode, perform a second grant process of granting to the user a game character designated by the user (step S20),
  wherein in the draw mode, the first granter accepts a selection instruction until the end process is performed even after the cumulative grant count has become equal to or greater than the reference count (see FIG. 4).

With the configuration above, when the cumulative grant count becomes equal to or greater than the reference count, execution of the designated mode, which is different from the draw mode, is permitted. Thus, it is possible to provide the user with a wide variety of strategies as to whether or not the user performs the draw mode until the cumulative grant count becomes equal to or greater than the reference count in order to perform the designated mode, and it is therefore possible to improve the strategic aspect of the computer-simulated draw. With the configuration above, when the cumulative grant count becomes equal to or greater than the reference count, the system prohibits starting a new iteration of the draw mode and permits execution of the designated mode, and it is therefore possible to reduce the possibility of the user forgetting to perform the designated mode. Moreover, with the configuration above, the first granter accepts a selection instruction until the end process is performed even in a state in which the cumulative grant count has become equal to or greater than the reference count in the draw mode, and it is therefore possible to allow the user to choose whether to continue or end the draw mode in such a state, thus improving the strategic aspect of the draw mode.

Note that the phrase "(two or more) selection candidates determined based on a computer-simulated draw and each corresponding to a game character" means to include those determined at least by two different methods (a) and (b) below and not to be limited thereto.

(a) Method of determining game characters based on a computer-simulated draw and determining selection candidates corresponding to the determined game characters.

(b) Method of determining selection candidates based on a computer-simulated draw, wherein when a selection candidate is selected by the user, a game character is determined corresponding to the selected selection candidate.

The method (a) above is the method of the embodiment described above. For example, in the context of an example according to the embodiment described above, the method (b) above is a method of determining attributes (the red attribute, the blue attribute, the green attribute and the colorless attribute in the embodiment described above) based on a computer-simulated draw and displaying attribute symbols representing the determined attributes in the candidate selection image, wherein when an attribute symbol is selected by the user, a game character having the attribute represented by the selected attribute symbol is determined by an additional computer-simulated draw. With the method (b) above, as with the method (a) above, it is possible to present to the user the "selection candidates determined based on a computer-simulated draw and each corresponding to a game character".

While the "predetermined parameter" in the embodiment described above is a parameter representing the number of in-game items (specifically, summon points) that can be purchased by real world currency, it may be any parameter representing the amount of virtual currency or virtual items in the game in other embodiments. The predetermined parameter is not limited to those consumed only for the granting of game characters, but may be those that can be used for other purposes. For example, with the information processing system, the user may be allowed to play a game different from the summon game by consuming the predetermined parameter.

The phrase "a game character that corresponds to the selected selection candidate is granted to the user in exchange for decreasing a predetermined parameter" does not mean to impose any limitation on the relationship between when the predetermined parameter is decreased and when the game character is given to the user. That is, "a game character is granted to the user in exchange for decreasing a predetermined parameter" means that the process of granting a game character to the user may be executed after the execution of the process of decreasing the parameter or the process of decreasing the parameter may be executed after the execution of the process of granting a game character to the user.

The phrase "grant a game character to the user" means to include transmitting data used for using a game character in a game (e.g., image data of the game character and data representing the ability thereof, etc.) from the server 1 to the terminal apparatus 2 of the user, and also include, where data used for using a game character in a game is stored in the terminal apparatus 2, making the data available on the terminal apparatus 2 (e.g., transmitting an instruction to permit the user of the data from the server 1 to the apparatus 2).

The phrase "update a cumulative grant count each time the first grant process is performed" does not mean to impose any limitation on the relationship between when the first grant process is performed and when the cumulative grant count is updated. That is, the phrase "update a cumulative grant count each time the first grant process is performed" means that the cumulative grant count may be updated after the first grant process is performed, or the cumulative grant count may be updated first after it is confirmed that the first grant process is to be performed, with the first grant process performed next.

In the embodiment described above, the information processing system can be said to include the following components:

a draw mode starter configured to start a draw mode (e.g., the normal summon mode) in response to a first start instruction given by the user (step S43);

a first display controller configured to, in the draw mode, display on a display device (e.g., the display section 24) two or more selection candidates (e.g., attribute symbols) determined based on a computer-simulated draw and each corresponding to a game character, in such a manner that a part of a property is shown for the game characters corresponding to the selection candidates (step S31);

a first granter configured to, in the draw mode, perform a first grant process, wherein when the user gives a selection instruction to select at least one of selection candidates in a state in which there are unselected selection candidates, a game character that corresponds to the selected selection candidate is granted to the user in exchange for decreasing a predetermined parameter (e.g., summon points) (step S33);

an ender configured to, in the draw mode, end the draw mode when an end instruction is given by the user or there is no unselected selection candidate left (step S36, S38) (note that when a new iteration of the draw mode is started in response to the first start instruction after the draw mode is ended by the ender, a new set of selection candidates that are determined by a new computer-simulated draw in the new iteration of the draw mode are displayed on the display device.);

a first counter configured to update a cumulative grant count each time the first grant process is performed in one or more iteration of the draw mode started in response to the first start instruction (step S67);

a permitter configured to permit execution of a designated mode when the cumulative grant count becomes equal to or greater than a first reference count (e.g., the permit count) (step S71);

a designated mode starter configured to start a designated mode (e.g., the designated summon mode) in response to a second start instruction given by the user (step S44);

a second display controller configured to, in the designated mode, display on the display device game characters used in a game in such a manner that the user can uniquely identify one or more of the game characters (step S16); and a second granter configured to, in the designated mode, perform a second grant process of granting to the user a game character designated by the user (step S20), wherein when a selection instruction is received in a state in which the number of unselected selection candidates is equal to the first number (e.g., one), the first granter decreases the amount by which the predetermined parameter is decreased for the selection instruction as compared with that in a state in which the number of unselected selection candidates is equal to the second number (e.g., five) greater than the first number.

With the configuration above, when the cumulative grant count becomes equal to or greater than the reference count, execution of the designated mode, which is different from the draw mode, is permitted. Thus, it is possible to make the user think whether or not to perform the draw mode until the cumulative grant count becomes equal to or greater than the reference count in order to perform the designated mode, and it is therefore possible to improve the strategic aspect of the computer-simulated draw.

Note that in other embodiments, the information processing system does not need to include some of the components of the embodiment described above and does not need to execute some of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the information processing system does not need to include other components and does not need to execute other processes.

As described above, the present embodiment is applicable to game systems and game programs, for example, with the aim of increasing the variety of strategies that can be employed by the user in a computer-simulated draw, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a processor and a memory coupled thereto, the processor being configured to control the information processing system to at least:
   start a draw mode in response to a first start instruction given by a user;
   in the draw mode, display on a display device two or more selection candidates determined based on a computer-simulated draw and each corresponding to a game character used in a game, in such a manner that the user can identify a part of a property of the game characters corresponding to the selection candidates;
   in the draw mode, perform a first grant process, wherein when the user gives a selection instruction to select at least one of unselected selection candidates in a state in which there are unselected selection candidates, a selected selection candidate is indicated as selected and a game character that corresponds to the selected selection candidate is granted to the user in exchange for decreasing a predetermined parameter; and
   in the draw mode, end the draw mode when an end instruction is given by the user or there is no unselected selection candidate left;
wherein when a new iteration of the draw mode is started in response to a new first start instruction after the draw mode is ended, the processor is configured to display on the display device a new set of selection candidates that are determined by a new computer-simulated draw in the new iteration of the draw mode; and
wherein when the selection instruction is received in such a state in which the number of unselected selection candidates is equal to a first number, the processor is configured to decrease an amount by which the predetermined parameter is decreased for the selection instruction as compared with that in a state in which the number of unselected selection candidates is equal to a second number greater than the first number;
the processor being configured to further control the information processing system to at least:
   update a cumulative grant count each time the first grant process is performed in one or more iteration of the draw mode started in response to the first start instruction;
   permit execution of a designated mode when the cumulative grant count becomes equal to or greater than a first reference count;
   start the designated mode in response to a second start instruction given by the user;
   in the designated mode, display on the display device one or more of the game characters in such a manner that the user can uniquely identify the game characters; and
   in the designated mode, perform a second grant process of granting to the user a game character designated by the user.

2. The information processing system according to claim 1, wherein:
in the draw mode, the processor is configured to display on the display device selection candidates corresponding to a set of game characters that are chosen by a probability-based computer-simulated draw from among a plurality of game characters including normal characters and rare characters, wherein a probability of a rare character being determined as a selection candidate is lower than a probability of a normal character being determined as a selection candidate; and
in the designated mode, the processor is configured to display on the display device a rare character or rare characters as the one or more game characters.

3. The information processing system according to claim 1, wherein:
in the draw mode, the processor is configured to display on the display device the selection candidates corresponding to a set of game characters that are determined by a probability-based computer-simulated draw from among a plurality of game characters including normal characters and rare characters, wherein a probability of a rare character being chosen as a selection candidate is lower than a probability of a normal character being chosen as a selection candidate; and the processor is configured to further control the information processing system to at least update a successive grant count each time a normal character is granted successively by the first grant process in the draw mode, and reset the successive grant count when a rare character is granted by the first grant process; and in the draw mode, on a condition that the successive grant count becomes equal to or greater than a second reference count, the processor is configured to display on the display device a predetermined number of selection candidates that correspond to rare characters.

4. The information processing system according to claim 1, wherein:

in the draw mode, the processor is configured to display on the display device the selection candidates corresponding to a set of game characters that are chosen by a probability-based computer-simulated draw from among a plurality of game characters including normal characters and rare characters, wherein a probability of a rare character being determined as a selection candidate is lower than a probability of a normal character being determined as a selection candidate; and the processor is configured to further control the information processing system to at least:
update a successive grant count each time a normal character is granted successively by the first grant process in the draw mode, and reset the successive grant count when a rare character is granted by the first grant process; and
increase a probability of a rare character being determined as a selection candidate in the draw mode when the successive grant count becomes equal to a third reference count, and reset the probability when the successive grant count is reset.

5. The information processing system according to claim 4, wherein the processor, when a rare character is granted by the second grant process in the designated mode in a state in which the probability is increased, is configured to maintain the increased probability.

6. The information processing system according to claim 1, wherein:

the processor is configured to prohibit starting a new iteration of the draw mode and permit execution of the designated mode when the cumulative grant count becomes equal to or greater than the reference count; and in the draw mode, the processor is configured to accept a selection instruction until the end process is performed even after the cumulative grant count becomes equal to or greater than the reference count.

7. The information processing system according to claim 1, wherein the one or more game characters displayed in the designated mode are game characters that can be determined as selection candidates by the computer-simulated draw in the draw mode.

8. The information processing system according to claim 1, wherein:

under certain conditions, the processor is configured to accept a selection instruction not in exchange for decreasing the predetermined parameter and grant a game character corresponding to the selection candidate selected by the selection instruction to the user; and the processor is configured to calculate the cumulative grant count as a sum between the number of times a game character is granted by the first grant process and the number of times a game character is granted by the selection instruction that is accepted not in exchange for decreasing the predetermined parameter.

9. The information processing system according to claim 1, wherein:

in the information processing system, different draw modes can be executed, between which a draw probability is varied for at least one game character; and the processor is configured to update the cumulative grant count for at least one of the draw modes, and update the cumulative grant count for each draw mode.

10. The information processing system according to claim 1, wherein:

the processor is configured to accept the first start instruction within a predetermined period in real time; and the processor is configured to accept the second start instruction within the predetermined period.

11. The information processing system according to claim 1, wherein in the designated mode, the processor is configured to grant to the user a game character designated by the user not in exchange for decreasing the predetermined parameter.

12. The information processing system according to claim 1, wherein the processor is configured to permit execution of the designated mode until the number of times the designated mode is executed becomes equal to a predetermined upper limit number of times.

13. The information processing system according to claim 1, wherein the predetermined parameter represents an amount of virtual currency or virtual items in the game.

14. An information processing apparatus, comprising:

a processor and a memory coupled thereto, the processor being configured to control the information processing apparatus to at least:

start a draw mode in response to a first start instruction given by a user;

in the draw mode, determine, based on a computer-simulated draw, two or more selection candidates each corresponding to a game character used in a game, wherein the selection candidates are presented to the user in such a manner that the user can identify a part of a property of the game characters corresponding to the selection candidates;

perform a first grant process, wherein when the user gives a selection instruction to select at least one of unselected selection candidates in a state in which there are unselected selection candidates, corresponding to the game characters, of the two or more selection candidates, a selected selection candidate is indicated as selected and a game character that corresponds to the selected selection candidate is granted to the user in exchange for decreasing a predetermined parameter; and in the draw mode, end the draw mode when an end instruction is given by the user or there is no unselected selection candidate left;

wherein when a new iteration of the draw mode is started in response to a new first start instruction after the draw mode is ended, the processor is configured to determine a new set of selection candidates that are determined by a new computer-simulated draw in the new iteration of the draw mode; and wherein when the selection instruction is received in such a state in which the number of unselected selection candidates is equal to a first number, the processor is configured to decrease an amount by which the predetermined parameter is decreased for the selection instruction as compared with that in a state in which the number of unselected selection candidates is equal to a second number greater than the first number;

the processor being configured to further control the information processing system to at least:

update a cumulative grant count each time the first grant process is performed in one or more iteration of the draw mode started in response to the first start instruction;

permit execution of a designated mode when the cumulative grant count becomes equal to or greater than a first reference count;

start the designated mode in response to a second start instruction given by the user; and in the designated mode, perform a second grant process of granting to the user a game character that is designated by the user from among one or more game characters that are presented to the user in such a manner that the user can uniquely identify the game characters.

15. A non-transitory computer-readable storage medium having stored therein instructions that, when executed by a processor of an information processing apparatus, cause the information processing apparatus to perform operations comprising:

starting a draw mode in response to a first start instruction given by a user;

in the draw mode, determining, based on a computer-simulated draw, two or more selection candidates each corresponding to a game character used in a game, wherein the selection candidates are presented to the user in such a manner that the user can identify a part of a property of the game characters corresponding to the selection candidates;

performing a first grant process, wherein when the user gives a selection instruction to select at least one of unselected selection candidates in a state in which there are unselected selection candidates, corresponding to the game characters, of the two or more selection candidates, a selected selection candidate is indicated as selected and a game character that corresponds to the selected selection candidate is granted to the user in exchange for decreasing a predetermined parameter; and in the draw mode, ending the draw mode when an end instruction is given by the user or there is no unselected selection candidate left;

wherein when a new iteration of the draw mode is started in response to a new first start instruction after the draw mode is ended, a new set of selection candidates is determined by a new computer-simulated draw in the new iteration of the draw mode; and wherein when the selection instruction is received in such a state in which the number of unselected selection candidates is equal to a first number, an amount by which the predetermined parameter is decreased is decreased for the selection instruction as compared with that in a state in which the number of unselected selection candidates is equal to a second number greater than the first number;

the non-transitory computer-readable storage medium further having stored therein further instructions that, when executed by the processor of the information processing apparatus, cause the information processing apparatus to perform further operations comprising:

updating a cumulative grant count each time the first grant process is performed in one or more iteration of the draw mode started in response to the first start instruction;

permitting execution of a designated mode when the cumulative grant count becomes equal to or greater than a first reference count;

starting the designated mode in response to a second start instruction given by the user; and in the designated mode, performing a second grant process of granting to the user a game character that is designated by the user from among one or more game characters that are presented to the user in such a manner that the user can uniquely identify the game characters.

16. An information processing method executed by an information processing system, the method comprising:

starting a draw mode in response to a first start instruction given by a user;

in the draw mode, displaying on a display device two or more selection candidates determined based on a computer-simulated draw and each corresponding to a game character used in a game, in such a manner that the user can identify a part of a property of the game characters corresponding to the selection candidates;

in the draw mode, performing a first grant process, wherein when the user gives a selection instruction to select at least one of unselected selection candidates in a state in which there are unselected selection candidates, a selected selection candidate is indicated as selected and a game character that corresponds to the selected selection candidate is granted to the user in exchange for decreasing a predetermined parameter;

in the draw mode, ending the draw mode when an end instruction is given by the user or there is no unselected selection candidate left;

when a new iteration of the draw mode is started in response to a new first start instruction after the draw mode is ended, displaying on the display device a new set of selection candidates that are determined by a new computer-simulated draw in the new iteration of the draw mode;

when the selection instruction is received in such a state in which the number of unselected selection candidates is equal to a first number, decreasing an amount by which the predetermined parameter is decreased for the selection instruction as compared with that in a state in which the number of unselected selection candidates is equal to a second number greater than the first number;

updating a cumulative grant count each time the first grant process is performed in one or more iteration of the draw mode started in response to the first start instruction;

permitting execution of a designated mode when the cumulative grant count becomes equal to or greater than a first reference count;

starting the designated mode in response to a second start instruction given by the user;

in the designated mode, displaying on the display device one or more of the game characters in such a manner that the user can uniquely identify the game characters; and in the designated mode, performing a second grant process of granting to the user a game character designated by the user.

17. The information processing method according to claim 16, further comprising:

in the draw mode, displaying on the display device selection candidates corresponding to a set of game characters that are chosen by a probability-based computer-simulated draw from among a plurality of game characters including normal characters and rare characters, wherein a probability of a rare character being determined as a selection candidate is lower than a probability of a normal character being determined as a selection candidate; and in the designated mode, displaying on the display device a rare character or rare characters as the one or more game characters.

18. The information processing method according to claim 16, further comprising:

in the draw mode, displaying on the display device the selection candidates corresponding to a set of game characters that are determined by a probability-based computer-simulated draw from among a plurality of game characters including normal characters and rare characters, wherein a probability of a rare character being chosen as a selection candidate is lower than a probability of a normal character being chosen as a selection candidate;

updating a successive grant count each time a normal character is granted successively by the first grant process in the draw mode, and resetting the successive grant count when a rare character is granted by the first grant process; and in the draw mode, on a condition that the successive grant count becomes equal to or greater than a second reference count, displaying on the display device a predetermined number of selection candidates that correspond to rare characters.

19. The information processing method according to claim 16, further comprising:

prohibiting starting a new iteration of the draw mode and permit execution of the designated mode when the cumulative grant count becomes equal to or greater than the reference count; and in the draw mode, accepting a selection instruction until the end process is performed even after the cumulative grant count becomes equal to or greater than the reference count.

20. The information processing method according to claim 16, wherein different draw modes are executable, between which a draw probability is varied for at least one game character; and further comprising updating the cumulative grant count for at least one of the draw modes, and updating the cumulative grant count for each draw mode.

* * * * *